(12) United States Patent  
Dai

(10) Patent No.: US 10,243,686 B1  
(45) Date of Patent: *Mar. 26, 2019

(54) HYBRID MULTIPLEXING OVER PASSIVE OPTICAL NETWORKS

(71) Applicant: Cox Communications, Inc., Atlanta, GA (US)

(72) Inventor: Yuxin Dai, Santa Rosa, CA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/700,757

(22) Filed: Sep. 11, 2017

Related U.S. Application Data

(63) Continuation of application No. 14/860,122, filed on Sep. 21, 2015, now Pat. No. 9,762,349.

(51) Int. Cl.
| | | |
|---|---|---|
| *H04J 14/08* | (2006.01) | |
| *H04J 14/02* | (2006.01) | |
| *H04J 3/16* | (2006.01) | |
| *H04Q 11/00* | (2006.01) | |

(52) U.S. Cl.
CPC ........ *H04J 14/0226* (2013.01); *H04J 3/1652* (2013.01); *H04J 14/08* (2013.01); *H04Q 11/0003* (2013.01); *H04Q 11/0067* (2013.01); *H04Q 2011/0016* (2013.01); *H04Q 2011/0032* (2013.01); *H04Q 2011/0033* (2013.01); *H04Q 2011/0045* (2013.01); *H04Q 2011/0086* (2013.01)

(58) Field of Classification Search
CPC ....... H04J 14/0226; H04J 14/08; H04J 3/1652
See application file for complete search history.

(56) References Cited

U.S. PATENT DOCUMENTS

| | | | |
|---|---|---|---|
| 9,425,918 B2 * | 8/2016 | Cheng | H04J 14/02 |
| 9,762,349 B1 * | 9/2017 | Dai | H04J 14/0226 |
| 2006/0093359 A1 * | 5/2006 | Lee | H04B 10/2587 398/70 |
| 2010/0086304 A1 * | 4/2010 | Mizutani | H04J 14/0282 398/71 |
| 2011/0026923 A1 * | 2/2011 | Kim | H01S 5/50 398/79 |
| 2012/0275784 A1 * | 11/2012 | Soto | H04B 10/2503 398/38 |
| 2013/0089325 A1 | 4/2013 | Sarashina et al. | |

(Continued)

*Primary Examiner* — Dzung D Tran
(74) *Attorney, Agent, or Firm* — Merchant & Gould

(57) ABSTRACT

Systems and methods for providing transmission and reception of hybrid time and wavelength division multiplexed signals on passive optical networks are provided. Networks that use shared transmission media avoid interference between transmitters by restricting the times or wavelengths that given transmitters may use to transmit their messages. The hybrid broadcast WDM TDM PON architecture enables transmitters to use multiple fixed wavelengths for parallel optical transmission within given timeslots to avoid interference with other transmitters and make use of inexpensive fixed optical components to gain a speed advantage over existing architectures while making use of their deployed infrastructure. A single scheduling manager controls the timeslots of upstream and downstream transmissions, which make use of existing standards.

20 Claims, 9 Drawing Sheets

(56) References Cited

U.S. PATENT DOCUMENTS

| | | | |
|---|---|---|---|
| 2014/0093232 A1* | 4/2014 | Hood | H04B 10/032 398/5 |
| 2014/0321863 A1* | 10/2014 | Diab | H04B 10/516 398/185 |
| 2015/0030324 A1* | 1/2015 | Chang | H01S 5/141 398/35 |
| 2015/0311669 A1* | 10/2015 | Chuang | H01S 5/0064 398/65 |

* cited by examiner

HYBRID MULTIPLEXING OVER PASSIVE OPTICAL NETWORKS

CROSS REFERENCE TO RELATED APPLICATION

This application is a continuation of application Ser. No. 14/860,122, filed Sep. 21, 2015, which application is incorporated herein by reference in its entirety.

BACKGROUND

Telecommunications networks provide for the transmission of signals between parties. In an Optical Access Network, signals are transmitted as beams of light over fiber optic cables between subscribers and a service provider. Optical Access Networks generally fall into two categories: Active Optical Networks and Passive Optical Networks. Active Optical Networks include electrically powered switching equipment used to manage the flow of signals to and from subscribers, whereas Passive Optical Networks use unpowered optical splitters/combiners to manage the flow of optical signals via shared lines. Passive Optical Networks are often preferred over Active Optical Networks by service providers due to their lower costs in initial installation, maintenance, and equipment.

Telecommunications networks are often measured by the rate at which signals transmit data across the telecommunications network. The data transmission rates are measured in terms of the bits per second transmitted across the network, which may be referred to as the "speed" of the network. As subscribers demand ever faster speeds from their service providers, the service providers will often upgrade the equipment provided to the subscribers, the service provider's equipment at the head end of a telecommunication's network, and line equipment installed in the field, including the transmission medium itself. These upgrades can be very expensive, especially if the equipment requires that tunable optics be used, and may cause interoperability issues across the telecommunications network as new equipment is rolled out or new lines and line equipment are installed in the field.

SUMMARY

Aspects of the present disclosure provide for systems and methods to enable the parallel transmission of broadcast signals at high speeds with low cost physical components. In various aspects, the signals are transmitted over a Passive Optical Network (PON) configured for a base speed of physical (PHY) transmission (e.g., 10 Gigabits per second (Gbps)) using hardware dedicated to providing a base speed of PHY rates, but at an effective data transmission rate, often referred as Media Access Control (MAC) rate, higher than the base speed. These higher speeds are achieved as a multiple of the base PHY speed (e.g., 2×, 4×, 8×) by performing a hybrid Wave Division Multiplexing (WDM) and Time Division Multiplexing (TDM) using equipment designed to use an array of low-cost receivers and transmitters (e.g., a transceiver array).

As will be understood, WDM combines multiple signals having different wavelengths onto a shared transmission medium to enable multiple signals to be sent simultaneously over the shared transmission medium without interfering with one another. In a PON using WDM, often referred to as WDM PON, each subscriber or Optical Network Terminal (ONT) will be assigned a pair of wavelengths to carry messages in downstream and upstream directions respectively. A pair of wavelengths assigned to one ONT will be multiplexed with the wavelengths assigned to other ONTs onto the shared transmission medium of fiber optic cables. In several aspects, carrier waves are generated as coherent beams of light of the given wavelength by laser diodes (LD). As will be understood, both the service provider equipment and the subscriber equipment must be capable of transmitting and receiving on the assigned wavelengths within the multi-wavelength group. Also, in order for an individual ONT to not be physically locked into a particular wavelength, tunable laser transmitters and tunable optical filters are normally required for WDM PON to be functional, and tunable optical transceivers are currently very expensive compared to static optical transceivers. Generally speaking, WDM PON as described above can be referred as wavelength-select WDM PON.

As will also be understood, TDM enables a transmission medium to carry multiple signals without the signals interfering with one another by regulating the times at which the signals are carried by the transmission medium. In a PON using TDM, often referred as TDM PON, messages to or from a first subscriber may be allowed to be transmitted in a first time slot dedicated for the first subscriber, whereas message to or from a second subscriber are allowed to be transmitted in a second time slot dedicated for the second subscriber. The signals destined for a given subscriber may be broadcast to all subscribers, who are free to ignore or discard the signals that are not destined for them. As will be understood, to prevent signals from drifting into different time slots and interfering with one another, at least one scheduler is provided to regulate when a given subscriber is permitted to transmit its signals.

A WDM/TDM hybrid multiplexing solution as described herein uses both WDM and TDM to provide subscribers with faster speeds while using inexpensive static optical transceivers. A message destined for a given party (e.g., a subscriber or the service provider) will be divided into multiple portions or sub-messages, each of which will be encoded on a carrier wave having a distinct wavelength. The messages (as several portions) will then be transmitted during a given timeslot for the receiving/transmitting subscriber so that the portions do not interfere with transmissions between the service provider and the other subscribers. Because each of the subscribers have an assigned timeslot, each subscriber can use the same set of wavelengths as the other subscribers on the shared transmission medium. Because each subscriber and the service provider use the set of same wavelengths for carrier waves, arrays of inexpensive static optical transceivers may be used by subscriber and service provider equipment, wherein each static transceiver in the array corresponds to one of the wavelengths used as a carrier wave for a portion of the message. The WDM/TDM hybrid PON as described above can be referred as Wavelength Broadcast WDM/TDM hybrid PON (WB-WTDM PON).

The array of transceivers used in a hybrid multiplexing solution provide a corresponding array of message portions that are each transmitted at a PON's base PHY speed. The array of signals are broadcast to multiple subscribers, but are all destined for a given subscriber, and may be ignored or discarded by the other subscribers. The number of transceivers (and hence the number of portions) define the factor at which the base PHY speed is multiplied for the given subscriber, i.e., if arrays consisting of n transceivers are used, the base PHY speed is multiplied by n. The service provider may thus provide a target speed by providing equipment having an appropriately sized array of transceivers.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views.

DETAILED DESCRIPTION

Figure 1:
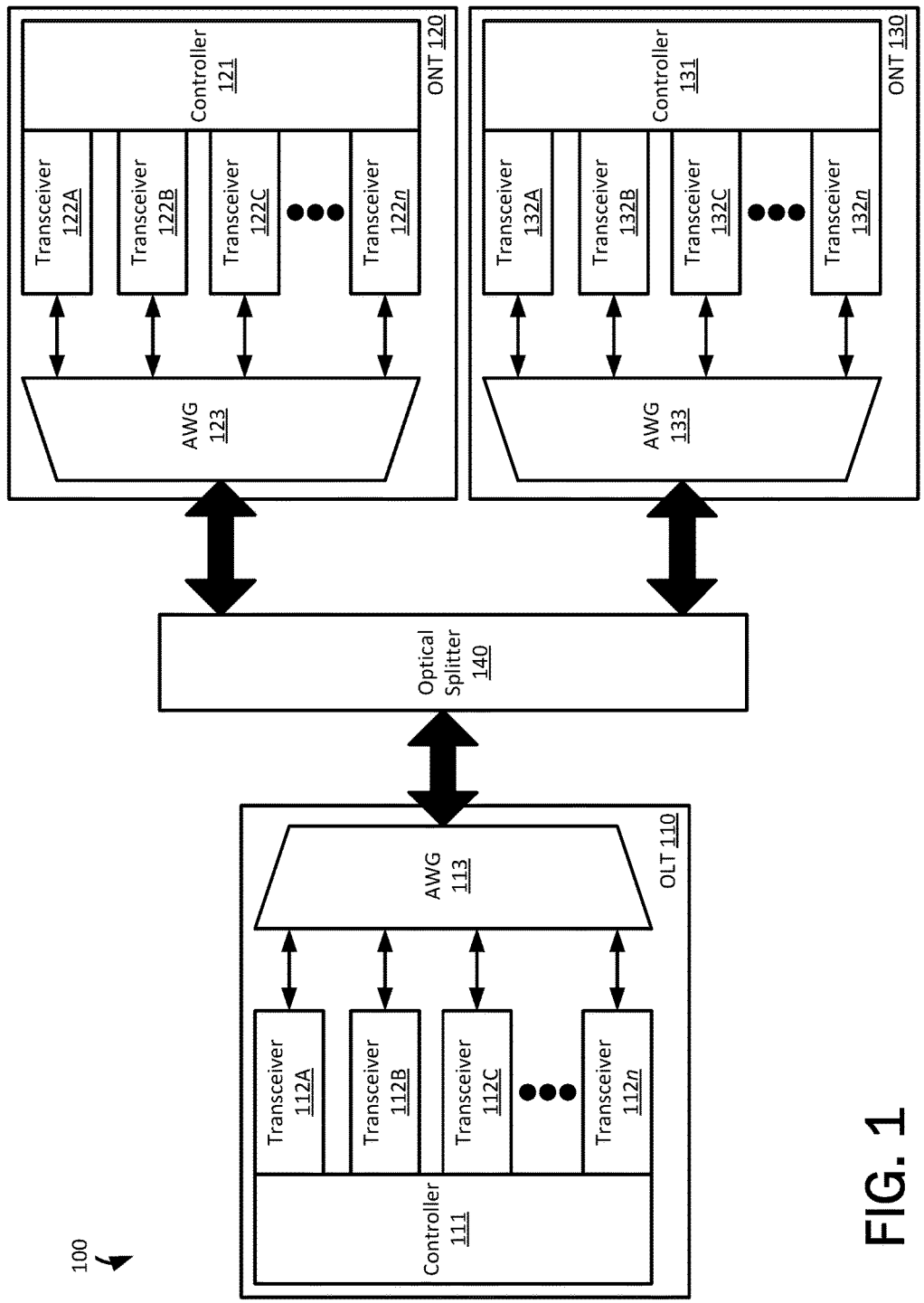
FIG. 1 is a block diagram illustrating an example architecture of a wavelength division multiplexing/time division multiplexing hybrid passive optical network.

As briefly described above, aspects of the present disclosure provide for methods and devices to provide for the parallel transmission of broadcast signals at high speeds with low cost physical components. In various aspects, the signals are transmitted over a Passive Optical Network (PON) configured for a base speed of physical (PHY) transmission (e.g., 10 Gigabits per second (Gbps)) using hardware dedicated to providing a base PHY speed, but at an effective data transmission rate, often referred as Media Access Control (MAC) rate, higher than the base speed. These higher speeds are achieved as a multiple of the base speed (e.g., 2×, 4×, 8×) by performing a hybrid Wave Division Multiplexing (WDM) and Time Division Multiplexing (TDM) using equipment designed to use an array of low-cost receivers and transmitters (e.g., a transceiver array).

As will be understood, WDM combines multiple signals having different wavelengths onto a shared transmission medium to enable multiple signals to be sent simultaneously over the shared transmission medium without interfering with one another. In a PON using WDM, often referred to as WDM PON, each subscriber or Optical Network Terminal (ONT) will be assigned a pair of wavelengths to carry messages in downstream and upstream directions respectively. A pair of wavelengths assigned to one ONT will be multiplexed with the wavelengths assigned to other ONTs onto the shared transmission medium of fiber optic cables. In several aspects, carrier waves are generated as coherent beams of light of the given wavelength by laser diodes (LD). As will be understood, both the service provider equipment and the subscriber equipment must be capable of transmitting and receiving on the assigned wavelengths within the multi-wavelength group for WDM PON to be functional. Also in order for a individual ONT to not be physically locked into a particular wavelength, tunable laser transmitters and tunable optical filters are normally required for WDM PON to be functional, and tunable optical transceivers are currently very expensive compared to static optical transceivers.

As will also be understood, TDM enables a transmission medium to carry multiple signals without the signals interfering with one another by regulating the times at which the signals are carried by the transmission medium. In a PON using TDM, often referred to as TDM PON, messages to or from a first subscriber may be allowed to be transmitted in a first time slot dedicated for the first subscriber, whereas message to or from a second subscriber are allowed to be transmitted in a second time slot dedicated for the second subscriber. The message destined for a given subscriber may be broadcast to all subscribers, who are free to ignore or discard the signals that are not destined for them. As will be understood, to prevent signals from drifting into different time slots and interfering with one another, a scheduler is provided to regulate when a given subscriber is permitted to transmit its signals.

A WDM/TDM hybrid multiplexing solution as described herein uses both WDM and TDM to provide subscribers with faster speeds while using inexpensive static optical transceivers. A message destined for a given party (e.g., a subscriber or the service provider) will be divided into multiple portions or sub-messages, each of which will be encoded on a carrier wave having a distinct wavelength. The portions will then be transmitted during a given timeslot for the receiving/transmitting subscriber so that the portions do not interfere with transmissions between the service provider and the other subscribers. Because each of the subscribers have an assigned timeslot, each subscriber can use the same set of wavelengths as the other subscribers on the shared transmission medium. Because each subscriber and the service provider use the same set of wavelengths for carrier waves, arrays of inexpensive static optical transceivers may be used by both subscriber and service provider equipment, wherein each static transceiver in the array corresponds to one of the wavelengths used as a carrier wave for a portion of the message. The WDM/TDM hybrid PON as described above can be referred to as Wavelength Broadcast WDM/TDM hybrid PON (WB-WTDM PON).

The array of transceivers used in a hybrid multiplexing solution provide a corresponding array of message portions that are each transmitted at a PON's base PHY speed. The array of signals are broadcast to multiple subscribers, but are all destined for a given subscriber, and may be ignored or discarded by the other subscribers. The number of transceivers (and hence the number of sub-signals) define the factor at which the base PHY speed is multiplied for the given subscriber, i.e., if n transceivers are used, the base PHY speed is multiplied by n, where n may be any positive integer. The service provider may thus provide a target speed by providing equipment having an appropriately sized array of transceivers.

FIG. 1 is a block diagram illustrating an example architecture 100 of a WDM/TDM hybrid PON. In the architecture 100, a service provider uses an Optical Line Terminal (OLT) 110 to transmit and receive signals over a PON with a first subscriber using a first Optical Network Terminal (ONT) 120 and with a second subscriber using a second ONT 130 (generally, ONT 120). As will be understood, a different number of subscribers with associated ONTs 120 may be part of the PON than those illustrated in FIG. 1; two subscribers are illustrated for the purpose of example, and do not limit the number of subscribers that may be part of a PON.

The architecture 100 of FIG. 1 illustrates the high-level features of a point to multipoint (P2MP) network for a service provider to provide services a plurality of subscribers. The network, and the equipment thereon, may operate according various PON PHY standards in addition to using the WDM/TDM hybrid described herein, such as, for example, Gigabit PON (GPON) or Ethernet PON (EPON), from which the WDM/TDM hybrid PON will inherit security, packet shaping, and encapsulation features with a new WB-WTDM PON MAC layer. Depending on the PON PHY standard applied by the service provider to its networks, variations to the WDM/TDM hybrid architecture 100 (i.e., WB-WTDM PON) may be made to comply with the existing PON PHY standard.

An optical splitter 140 is deployed between the service provider and the subscribers. In various aspects, the transmission medium (e.g., fiber optic cabling) between the OLT 110 and the optical splitter 140 is shared by multiple subscribers, whereas the transmission medium between the optical splitter 140 and each ONT 120, 130 is dedicated for a given subscriber. The optical splitter 140 is therefore operable to split signals carried on the shared medium into signals carried on the dedicated media, and to combine signals carried on the dedicated media into a signal carried on the shared medium. As will be understood, an optical splitter 140 may split a signal into two or more copies of the signal (or combine two or more signals into a single signal), and multiple optical splitters 140 may be daisy-chained (i.e., an optical splitter 140 may use the output of another optical splitter 140 as input in series) to produce any number of split signals from a single signal (or combine any number of split signals into a single signal).

As will be understood, an optical splitter 140 is a passive device, requiring no power to operate, although it may be used in conjunction with active device such as optical amplifiers, repeaters, and shaping circuits to increase the strength of the signals transmitted by the optical splitter 140. The optical splitter 140 may be deployed at a node within the PON proximate to the subscribers, to reduce the cost of running and maintaining several dedicated lines to individual subscribers. For example, an optical splitter 140 may be deployed on a utility pole or in a cable box proximate to several subscribers' premises.

An OLT 110 is a system at the head-end of a PON used to process and/or route signals from the service provider's network and provides optical signals for transmission to subscribers, and to convert optical signals from the subscribers to electrical signals for processing and transmission to the service provider's network as optical and/or electrical signals. The signals received from or transmitted to the service provider may be optical, electrical, or radio signals carried over the appropriate transmission medium. Signals received from the service provider's network are processed by a controller 111 (e.g., a MAC controller for the WB-WTDM PON) for the transceivers 112A-n (collectively transceivers 112) to generate a series of optical carrier waves that will carry the portions of the messages destined for subscribers, which in turn are multiplexed by an Arrayed Wave Guide (AWG) 113 for transmission on the shared fiber optic transmission medium. Similarly, in reverse, signals received from the subscribers via the shared fiber optic transmission medium are demultiplexed by the AWG 113 into a series of optical carrier waves which are received by the appropriate transceivers 112, and processed by the controller 111. The controller 111, when the PON uses the WDM/TDM hybrid disclosed herein, also schedules when each ONT 120 may transmit in its given TDM time window.

The OLT 110 is deployed at a head-end of a telecommunications network to provide services from the service provider to subscribers. The services may include internet, television, and telephone services, and not all of the subscribers in a given set need to be provided with each of the services. For example, a first subscriber may be provided with internet, telephone, and television services, whereas a second subscriber may only be provided with one of the services (e.g., internet), and a third subscriber with two of the services (e.g., telephone and television). A service provider may have any number of OLTs 110 to provide service to large numbers of sub scribers.

A ONT 120 is deployed at or near a subscriber's premises to receive services from the service provider and to transmit communications back to the service provider. For example, an ONT 120 may be deployed to a utility pole, cable box, or exterior wall of a subscriber's premises. In another example, an ONT 120 may be deployed interior to a subscriber's premises, such as, for example, in a server or utility room, where the ONT 120 acts as a connection point between the PON and the subscriber's network, which may be electrical (e.g., coaxial copper wiring, Ethernet), optical, or radio (e.g., Wi-Fi, Bluetooth). In yet another example, when the subscriber's premises are fully wired for fiber optic transmissions, the ONT 120 may be installed at or near a receiving device, such as a television, set top box, computer, modem, or telephone.

Each ONT 120, 130 includes, a controller 121, 131, a plurality of transceivers 122A-n, 132A-n (collectively, transceivers 122, 132), and an AWG 123, 133 respectively. Similar to the components of the OLT 110, the AWGs 123, 133 multiplex and demultiplex signals for the arrays of transceivers 122, 132, which are in communication with the controllers 121, 131 to process the signals for receipt and transmission.

Figure 2:
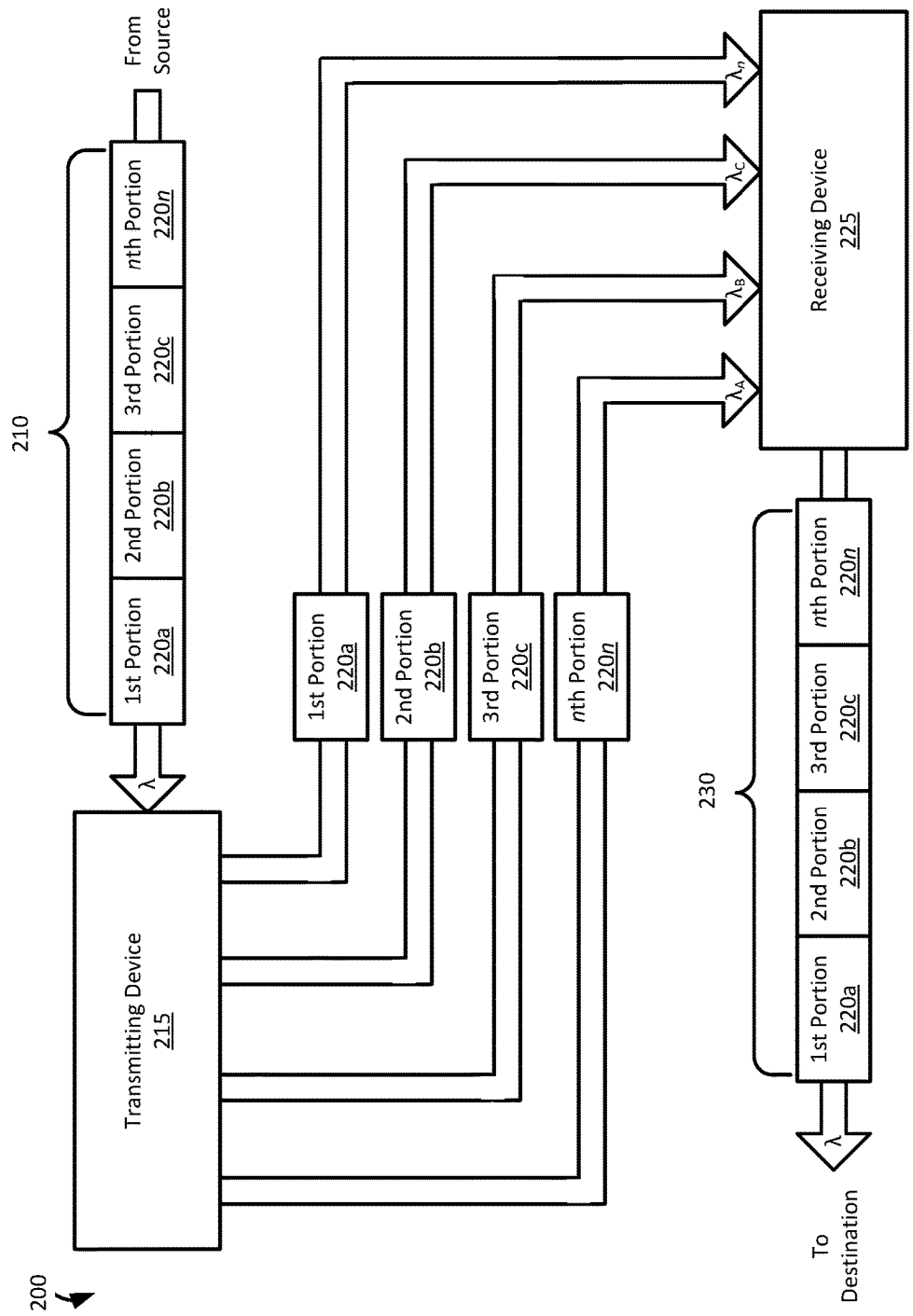
FIG. 2 is a block diagram illustrating an example WDM/TDM hybrid transmission of a message as it is divided and reassembled.

FIG. 2 is a block diagram illustrating an example WDM/TDM hybrid transmission 200 of a message as it is divided and reassembled. As discussed herein, outgoing messages 210 are received from a source by a transmitting device 215 that divides the outgoing message 210 into several portions 220a-n (collectively, portions 220) for transmission to the receiving device 225, wherein each portion 220 is transmitted at its own wavelength. The receiving device 225 reassembles the portions 220 into a reassembled message 230, which is then used by the receiving device 225 or delivered to a destination. In one aspect, an OLT 110 is the transmitting device 215 and an ONT is the receiving device 225 in the downstream direction, while in another aspect, an ONT 120 is the transmitting device 215 and the OLT is the receiving device 225 in the upstream direction; both OLTs 110 and ONTs 120 are operable to transmit and receive messages in a WDM/TDM hybrid PON.

An outgoing message 210 is received by the transmitting device 215 from its source via the appropriate means. For example, an OLT 110 may receive the outgoing message 210 (downstream) from a service provider via a fiber optic receiver, or an ONT 120 may receive the outgoing message 210 (upstream) from a subscriber over an Ethernet receiver. Similarly, a reassembled message 230 is transmitted by the receiving device 225 to its destination via the appropriate means. For example, an OLT 110 may transmit the reassembled message 230 to a service provider's router or switch via a fiber optic receiver, or an ONT 120 may transmit the reassembled message 230 to a subscriber over an Ethernet receiver.

As illustrated in FIG. 2, for purposes of simplicity, the outgoing message 210 is identical to the reassembled message 230. As will be understood, additional processing may be performed by transmitting device 215 and/or the receiving device 225 to alter the encapsulation format, perform Forward Error Correction (FEC), and perform bit swapping or other encryption operations to the message.

As will be also understood, although the outgoing messages 210 and reassembled messages 230 are illustrated in FIG. 2 as being received and transmitted as monolithic messages over one wavelength or frequency, this is done for purposes of simplicity. One of skill in the art will appreciate that the present disclosure may be extended to encompass receiving and transmitting outgoing messages 210 and reassembled messages 230 in portions over multiple wavelengths or frequencies. The transmitting device 215 and the receiving device 225 may thus act as repeaters, translate the messages from one transmission medium to another (e.g., from Ethernet cable to fiber optic cable), adjust an encapsulation format, or increase/decrease the number of portions that the message is divided into.

Depending on the length of the outgoing message 210, it may be divided evenly or unevenly among the portions 220. As will be understood, not all outgoing messages 210 may comprise the same number of bits. For example, a message formatted as an Ethernet packet using standard frames may have anywhere from 64 to 1,518 bytes depending on the size of its payload, and whether optional tags are included; jumbo frames may include even more bytes. The transmitting device 215 is therefore operable to divide the outgoing message 210 evenly or unevenly into portions 220. For example, when dividing the outgoing message 210 evenly, each portion 220 would contain approximately the same number of bits, such that, when dividing an outgoing message 210 of 608 bits into three portions 220, the first and second portions 220a, 220b may both comprise 203 bits, whereas a third portion 220c may comprise 202 bits. Alternatively, each portion 220 may comprise a fixed number of bits, such that if the outgoing message 210 is not large enough, some portions 220 may be null or partially null. For example, if each portion 220 were sized to comprise 1,500 bits, but the outgoing message 210 is only 3,506 bits in length, the first 1,500 bits may be assigned to the first portion 220a, the next 1,500 to the second portion 220b, the remaining 506 to the third portion 220c which would be partially null (for the remainder of its fixed number of bits), and any remaining portions 220 would be null. A portion 220 (or a part thereof) that is null will have no data encoded onto the associated carrier wave by the transmitting device 215.

In various aspects, the transmitting device 215 is operable to divide the outgoing message 210 into portions 220 according to various methods. In one example, the transmitting device 215 cuts the outgoing message 210, such that the first portion 220a may comprise the first x bits of the outgoing message 210 (e.g., $b_1$-$b_x$), the second portion 220b the next several bits (e.g., $b_{x+1}$-$b_{2x}$), etc., and the nth portion 220n the last several bits of the outgoing message 210. In another example, the transmitting device 215 may sample the outgoing message 210 such that the first portion 220a may comprise the first bit and every bit n+1 ($b_1$, $b_{n+1}$, $b_{2n+1}$, etc.), the second portion 220b the second bit and every bit n+2 ($b_2$, $b_{n+2}$, $b_{2n+2}$, etc.), etc. and the nth portion 220n the nth bit and every bit a multiple thereof ($b_n$, $b_{2n}$, $b_{3n}$, etc.). The transmitting device 215 is also operable to divide the message into portions irregularly (i.e., not having a regular formula defining which bits comprise which portion 220) so long as the receiving device 225 understands how the message is to be reassembled.

Each portion 220 is encoded by the transmitting device 215 onto a carrier wave having a wavelength distinct from the wavelengths of the other carrier waves so that they do not interfere with one another during transmission. In various aspects, the wavelengths chosen to transmit the portions 220 may depend on which device is the transmitting device 215. For example, wavelengths from the L and C bands (i.e., 1565-1625 nm and 1530-1565 nm) may be reserved for use by OLTs 110 and ONTs 120 respectively. As will be understood, other transmission bands, such as the O band (1260-1360 nm) and S band (1460-1530 nm), may also be used.

When it is time to transmit the outgoing message 210 (e.g., when a timeslot for a given subscriber occurs), all the portions 220 of the outgoing message 210 are simultaneously transmitted to the receiving device 225. Because the outgoing message 210 has been divided into portions 220, the entirety of the message will arrive at the receiving device 225 sooner that if the outgoing message 210 were sent as a whole. For example, when using components capable to transmitting and receiving at 10 Gbps, dividing the outgoing message 210 into four portions 220 would enable it to be received four time sooner than not dividing it—effectively raising the burst speed of the PON to 40 Gbps.

Once each portion 220 has been received by the receiving device 225, the incoming portions 220 of the message are reassembled. The receiving device 225 reverses the methodology used by transmitting device 215 to divide the outgoing message 210 to reunite the portions 220 into the reassembled message 230. For example, when the transmitting device 215 has cut the message into portions 220, the receiving device 225 is operable to read the first portion 220a as the first part of the reassembled message 230, the second portion 220b as the second part of the reassembled message 230, etc. Similarly, when the transmitting device 215 has sampled the message into portions 220, the receiving device 225 is operable to iteratively read each bit from each portion 220 to create the reassembled message 230.

Figure 3:
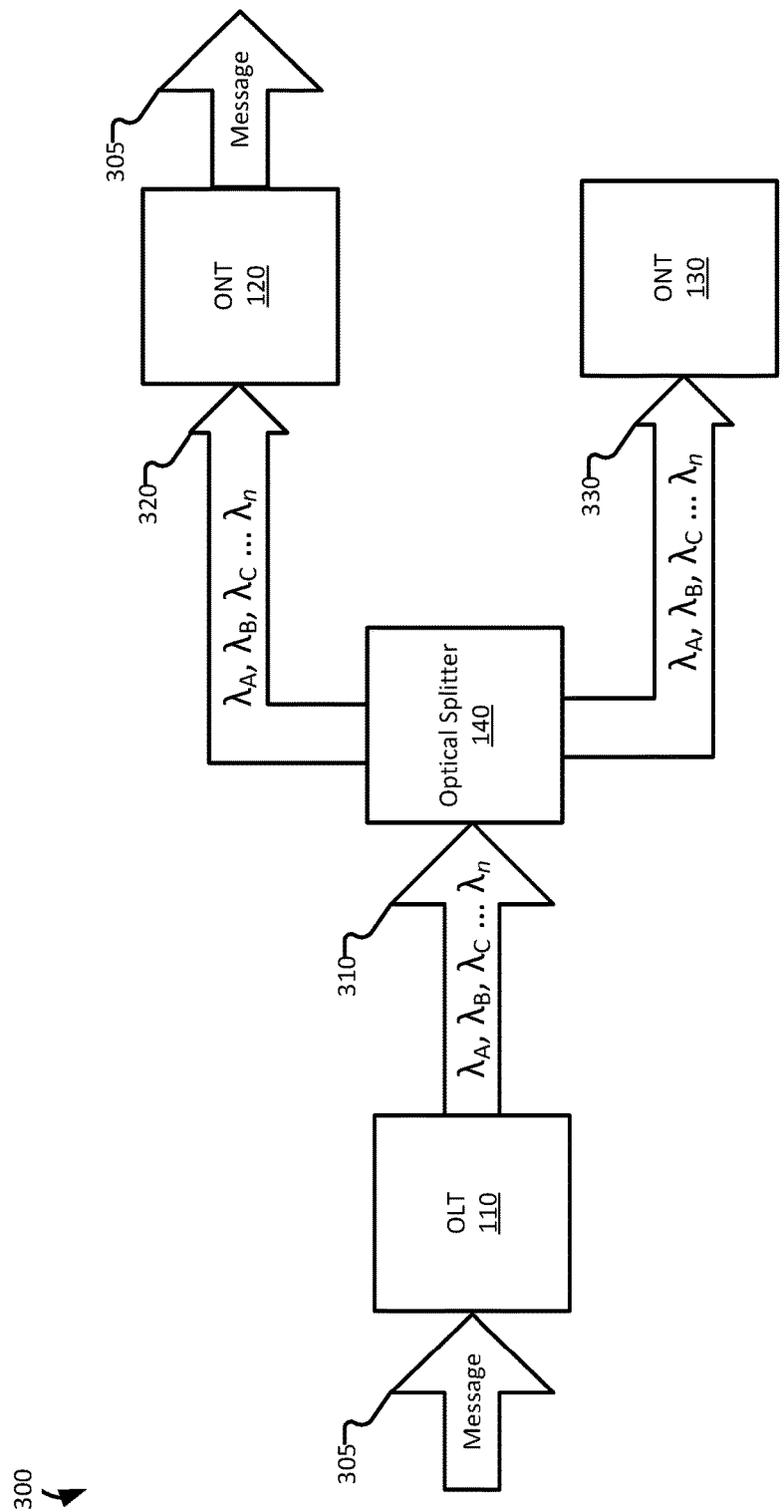
FIG. 3 is a block diagram illustrating an example optical signal pathway from a service provider to a subscriber.

FIG. 3 is a block diagram illustrating an example optical signal pathway 300 in a WDM/TDM hybrid PON where the signal is transmitted from a service provider to a subscriber. In the example optical signal pathway 300, a downstream message 305 begins at a service provider, where it is divided by an OLT 110 and each portion of the divided message is encoded onto one of several carrier waves having wavelengths $\lambda_A$, $\lambda_B$, $\lambda_C$, . . . $\lambda_n$ that are transmitted as broadcast signal 310 to an optical splitter 140. The broadcast signal 310 includes each of the several carrier waves (onto which a portion of downstream message 305 has been encoded) and is sent to all ONTs 120, 130 in communication with the OLT 110. A given downstream message 305, however, is destined for only one subscriber, and the ONTs 120, 130 will determine whether to forward the downstream message 305 to their associated subscriber or to discard/ignore the downstream message 305.

The number of carrier waves onto which portions of the downstream message 305 will be encoded is determined based on the number of matching transceivers used by the OLT 110 and the ONTs 120, 130. For example, if an OLT 110 transmits using four transceivers 112, the ONTs 120, 130 will each use four transceivers 122, 132 to receive the split signals 320, 330 from the broadcast signal 310, and the downstream message 305 may therefore be divided into four portions, each carried by an associated carrier wave. In some aspects, if the downstream message 305 is short enough, not all carrier waves may be employed; some carrier waves may not be encoded with a portion of the downstream message 305 if the others are sufficient to carry the whole downstream message 305. In other aspects, such as when hardware is upgraded across the PON to include more transceivers in the OLT 110 and ONTs 120, 130, upgraded hardware may use all of the available carrier waves to communicate with other upgraded hardware, but may use only the carrier waves that an un-upgraded hardware has available when communicating with un-upgraded hardware. For example, a service provider may upgrade its OLTs 110 from four transceivers 112 to eight, which would then be capable of communicating with an upgraded first ONT 120 with eight transceivers 122 using eight carrier waves (e.g., having wavelengths $\lambda_{1-8}$), and with an un-upgraded second ONT 130 with four transceivers 132 using four carrier waves (e.g., having wavelengths $\lambda_{1-4}$). In this way a service provider may gradually roll-out upgrades to hardware while providing subscribers with upgraded hardware the upgraded services before the roll-out is complete.

In various aspects, different methods may be used to encode the downstream message 305 onto the several carrier waves that comprise the broadcast signal 310. As one of skill in the art will understand, several modulation schemes may be employed to encode portions of the message onto the carrier waves, including, but not limited to amplitude shift keying schema (including Quadrature Amplitude Modulation (QAM) and On-Off Keying (OOK)), pulse-position modulation (PPM), and phase shift keying (PSK). In various aspects, each portion of the downstream message 305 may be encoded via the OOK of its associated carrier wave. In additional aspects, each portion may be encoded via PPM by varying a pulsing carrier wave's transmission time relative to a base time for transmission.

To prevent the carrier waves from interfering with one another, the transceivers 112 are selected to use wavelengths to comply with dense wavelength division multiplexing (DWDM) or coarse wavelength division multiplexing (CWDM) standards, such as, for example, or ITU-T G.694.1 and G.694.2. DWDM is enables up to 80 channels to be used in a single fiber optic cable and CWDM enables up to 16 channels to be used. DWDM and CWDM specify the minimum spacing between channels. For example, each carrier wave may be selected to have a channel spacing of 200 GHz (i.e., 1.6 nm) between the other carrier waves. As will be understood, different channel spacing arrangements (e.g., 20 nm, 0.8 nm, 0.4 nm) may also be employed based on the requirements of the relevant standard and the number of carrier waves used on a given transmission medium.

Although more channels may be used to transmit information at the same under DWDM than under CWDM, the greater channel spacing in CWDM enables less expensive hardware, which may be more prone to wavelength drift, to be used than is practical under DWDM.

As illustrated, the optical splitter 140 splits the broadcast signal 310 into a first split signal 320 and a second split signal 330. As will be understood, the broadcast signal 310 may be split into more split signals than illustrated in FIG. 3; each subscriber in communication with the service provider via the optical splitter 140 will be associated with a dedicated split signal.

The ONTs 120, 130 each receive their respective split signals 320, 330 and determine how to handle the received split signals 320, 330. Because the broadcast signal 310 is sent to all of the subscribers, the ONTs 120, 130 must determine whether the downstream message 305 carried by the split signal 320, 330 is destined for the subscriber associated with the ONT 120, 130.

The ONTs 120, 130 use the TDM aspect of the WDM/TDM hybrid PON to determine whether the downstream message 305 is destined for the associated subscriber. As an aspect of a WDM/TDM hybrid PON, each subscriber may be assigned a timeslot or multiple timeslots in which they will receive downstream messages 305 from the service provider. Split signals received during an assigned timeslot will be accepted by the ONT 120, 130 and split signals received outside of an assigned timeslot will be ignored or discarded by the ONT 120, 130 because they are destined for a different subscriber.

Additionally, the service provider may vary the bandwidth of service for an individual subscriber by increasing or reducing the number of timeslots assigned to a given subscriber within a given period of time. Timeslot assignment may occur during an initial "handshaking" procedure when an ONT 120, 130 is added to the PON, and timeslots may be periodically reassigned as network conditions change. A service provider may thus vary an overall bandwidth for a subscriber's connection while maintaining a constant burst speed for each client.

When it is determined that the subscriber is the destined recipient, as is illustrated by ONT 120, the ONT 120 will demultiplex the carrier waves of the split signal 320 to process and receive the downstream message 305, which it then passed on to the subscriber or used by the ONT 120.

When it is determined that the subscriber is not the destined recipient, as is illustrated by ONT 130, the ONT 130 will ignore or discard the split signal 330 and the downstream message 305 will not be passed on to the subscriber or used by the ONT 130.

Figure 4:
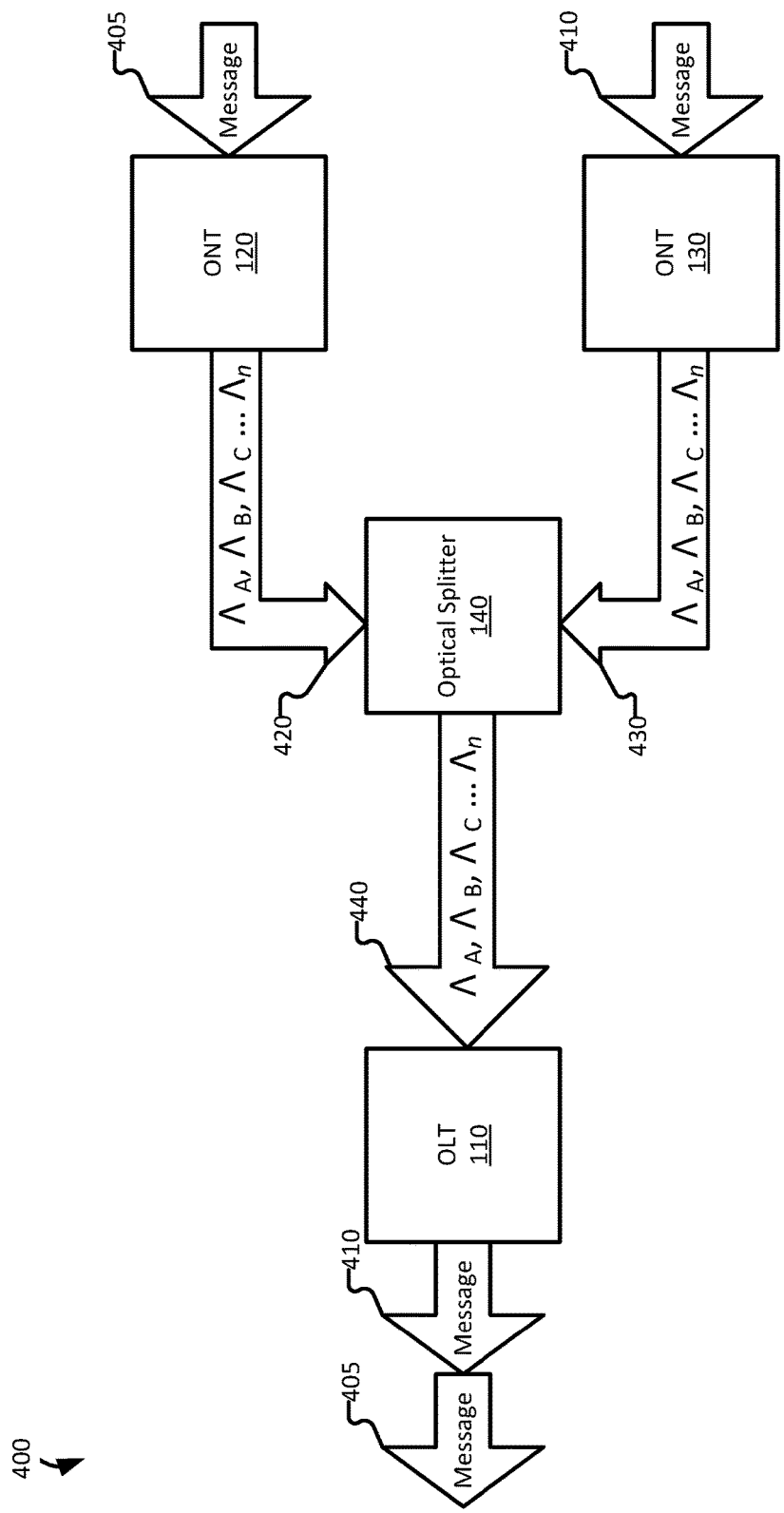
FIG. 4 is a block diagram illustrating an example optical signal pathway from the subscribers to the service provider.

FIG. 4 is a block diagram illustrating an example optical signal pathway 400 in a WDM/TDM hybrid PON where signals are transmitted from the subscribers to the service provider. In the example optical signal pathway 400, a first upstream message 405 is generated by a first subscriber and a second upstream message 410 is generated by a second subscriber. The ONTs 120, 130 for each subscriber divide the respective upstream messages 405, 410 and each of the portions of the divided messages are encoded onto one of several carrier waves having wavelengths $\Lambda_A, \Lambda_B, \Lambda_C, \ldots \Lambda_n$ that are transmitted as modulated signals 420, 430 to an optical splitter 140, which are forwarded to the OLT 110 as combined signal 440. At the OLT 110, the combined signal 440 is demultiplexed and the upstream messages 405, 410 are reassembled and passed on to the provider's network or are used by the OLT 110.

As will be understood, each ONT 120, 130 generates carrier waves having the same set of wavelengths $\Lambda_A$, $\Lambda_B$, $\Lambda_C$, ... $\Lambda_n$ as the other ONTs 120, 130, but which differ from the set of wavelengths $\lambda_A$, $\lambda_B$, $\lambda_C$, ... $\lambda_n$ generated by the OLT 110 for carrier waves when sharing a transmission medium for upstream and downstream communication. The wavelengths $\Lambda_{A-n}$, and the associated hardware, are selected using the same standard used to select the hardware to generate the wavelengths $\lambda_{A-n}$, and will be spaced according to the same standards.

To prevent each ONT 120, 130 from interfering with the other on the shared transmission medium, timeslots to transmit messages are assigned to each ONT 120, 130 for the subscribers. During a timeslot, only the associated ONT 120, 130 is permitted to transmit messages; all other ONTs 120, 130 must wait for their timeslot before transmitting their subscribers' messages. In various aspects, the timeslots to transmit correspond to the timeslots to receive, while in other aspects, each set of timeslots are independent from one other.

The timeslots may be assigned evenly or unevenly, to provide some subscribers with different bandwidths. Timeslots are assigned to ONTs 120, 130 such that the modulated signals 420, 430 do not arrive at the optical splitter 140 at the same time in each wavelength. Because of the potentially different distances between each ONT 120, 130 and the splitter 140, the modulated signals 420, 430 may take different amounts of time to propagate to the optical splitter 140. Therefore, the travel time for the modulated signals 420, 430 will be taken into account when assigning timeslots, which may result in two or more subscribers having overlapping timeslots to transmit, as seen from the ONTs 120, 130, so long as the timeslots do not allow for the modulated signals 420, 430 to be received at overlapping times at the optical splitter 140 in each wavelength.

To account for variances in propagation speeds and how ONTs 120, 130 track their timeslots, a subscriber's timeslot may be flanked by null-timeslots. A null-timeslot is a period of time when no ONT 120, 130 is assigned to transmit that acts as padding between two ONTs' timeslots so that if either ONT's modulated signal drifts from its timeslot (due to line degradation, line temperature, differing clock speeds, etc.) it will not interfere with the other ONT's modulated signal. As will be understood, because a null-timeslot is not (nominally) used for transmission, which negatively effects the effective speed of the network, a service provider will seek to minimize the length of time assigned for null-timeslots. The null time-slots may be periodically readjusted to account for changing network conditions.

From the optical splitter 140, the combined signal 440 is propagated to the OLT 110. Because each modulated signal 420, 430 arrives at the optical splitter 140 at a distinct time, the upstream messages 405, 410 are carried in sequence to the OLT 110. For example, when the first modulated signal 420 is received at $t_0$ and the second modulated signal is received at $t_1$, the combined signal 440 will carry both modulated signals 420, 430 on the carrier waves having wavelengths $\Lambda_A$, $\Lambda_B$, $\Lambda_C$, ... $\Lambda_n$ so that, in each carrier wave, the first upstream message 405 is received by the OLT 110 before the second upstream message 410.

The OLT 110 demultiplexes the combined signal 440 and reassembles each upstream message 405, 410 for delivery to the service provider's network or use by the OLT 110. Because the carrier waves carry each upstream message 405, 410 at a different times, the OLT 110 may segment the combined signal 440 into the first upstream message 405 and the second upstream message 410 based on a knowledge of the timeslots at which each carrier wave of the modulated signals 420, 430 were assigned to arrive at the optical splitter 140. The OLT 110 may also, or alternatively, segment the combined signal 440 by reading a message header contained in one or more of the portions of the upstream messages 405, 410.

Figure 5:
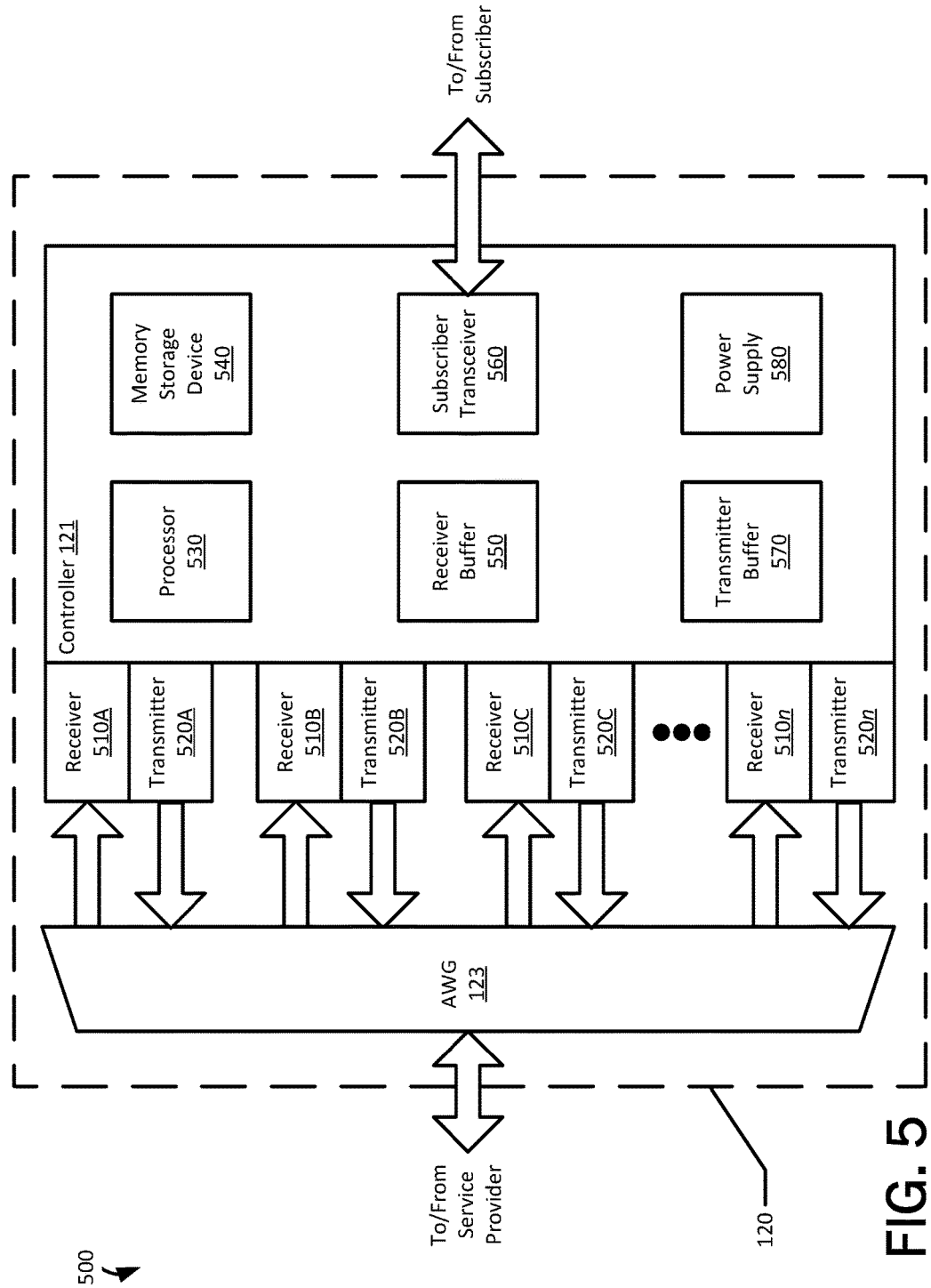
FIG. 5 is a block diagram illustrating an example detailed optical network terminal to send and receive signals for a subscriber.

FIG. 5 is a block diagram illustrating an example detail 500 of an ONT 120 operable for use in a WDM/TDM hybrid PON to send and receive signals for a subscriber. Each subscriber accessing the PON is associated with their own ONT 120, and the ONT 120 acts as an interface between the PON and the subscriber's networked devices (e.g., set-top boxes, telephones, televisions, computers, modems).

To receive and send signals, the ONT 120 uses arrays of receivers 510A-n (collectively, receivers 510) and transmitters 520A-n (collectively, transmitters 520) respectively. Each array is matched by wavelength to a corresponding array at the service provider's OLT 110, discussed in greater detail in FIG. 6. The matched arrays are sized to meet the service provider's target speed increase for the WDM/TDM hybrid PON. Although not required, the number of receivers 510 and transmitters 520 may be equal, but depending on the service provider's targeted speed increases for uploads and downloads, may be different is size. For example, if the service provider targets a 2× download speed increase, the ONT 120 will include two receivers 510 matched to the transmitter array of the OLT 110. Similarly, if the service provider targets a 4× upload speed increase, the ONT 120 will include four transmitters 520 matched to the receiver array of the OLT 110. The number of receivers 510 or transmitters 520 in the respective array may be any number to meet the service provider's targeted speed increase.

The receivers 510 are each operable to receive a carrier wave having a given wavelength $\lambda$ onto which a portion of a downstream message 305 from the service provider is encoded. Because in a WDM/TDM hybrid PON all of the receivers 510 for a given ONT 120 receive messages at the same time during a given timeslot, the ONT 120 may be constructed with receivers 510 that have a fixed wavelength at which they receive.

The transmitters 520 are each operable to transmit a carrier wave having a given wavelength $\Lambda$ onto which a portion of an upstream message 405 from the subscriber is encoded. Because in a WDM/TDM hybrid PON all of the transmitters 520 for a given ONT 120 may transmit at the same time during a given timeslot, the ONT 120 may be constructed with transmitters 520 that have a fixed-wavelength at which they transmit.

Due to the cost differential between tunable and fixed-wavelength receivers 510 and transmitters 520, the use of fixed wavelength transceiving components can significantly reduce the equipment costs for a service provider maintaining the WDM/TDM hybrid PON disclosed herein compared to the equipment costs of other WDM PON arrangements. As will be understood, fixed wavelength transceiving components nominally generate or receive beams of light at a static wavelength, but some drift in wavelength is expected and one of skill in the art will understand how to compensate. In various aspects, each receiver 510 is a photodiode using a material having bandgap properties matched to the received signals' wavelengths, such as, for example, silicon, germanium, indium gallium arsenide, lead(II) sulfide, or mercury cadmium telluride. In various aspects, each transmitter 520 may be a laser diode (LD) having a set wavelength, and the array of transmitters 520A-n will cover the set of wavelengths used to upload upstream messages 405 from the subscribers to the service provider.

The receivers 510 and transmitters 520 may be integrated into a single hardware package as a transceiver or may be separate devices. By using separate hardware for the receivers 510 and the transmitters 520 (as opposed to integrated transceivers) in an ONT 120, a service provider can set different target speed increases for downloads (i.e., transmission from service provider to subscriber) and uploads (i.e., transmission from subscriber to service provider). By using separate hardware, greater control over the wavelengths of carrier waves may be exercised.

In various aspects, the signals received by the receivers 510 and sent by the transmitters 520 are carried to and from the ONT 120 via a single transmission medium (e.g., one fiber optic cable) in communication with the service provider. In other aspects, a first transmission medium carries messages from the service provider and a second transmission medium carried messages to the service provider. The optical signals are demultiplexed or multiplexed when leaving or entering the ONT 120 respectively. As illustrated in FIG. 5, an AWG 123 is an interface between the arrays of receivers 510 and transmitters 520 and the service provider, and is operable to demultiplex/multiplex optical signals having several carriers waves at distinct wavelengths. In some aspects, the AWG 123 may be substituted for a thin film filter or other mux device. When multiple transmission media are used (e.g., separate fiber optic cables for incoming and outgoing signals) multiple AWG 123 are also employed to demultiplex/multiplex different signals of differing wavelengths onto one of the multiple transmission media.

The controller 121 includes a processor 530 and a memory storage device 540 including instructions, which, when executed by the processor 530, provide the functions of the ONT 120, including the sending, receiving, and processing of signals as part of a WDM/TDM hybrid PON. In terms of the Open System Interconnection (OSI) model, the controller 121 manages the functions of at least the PHY and data link layers of the network, including the Logical Link Control (LLC) and MAC sublayers. In some aspects, the controller 121 may also manage the functions of higher layers (e.g., network and transport layers).

The memory storage device 540 includes one or more computer-readable storage media. Computer-readable storage media are articles of manufacture operable to store data or computer-executable instructions. The term computer-readable storage media does not include transmission media over which signals are propagated. Example types of computer-readable storage media include, but are not limited to: solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices or articles of manufacture that store data.

The bit streams of split signals 320 received by the receivers 510 are interpreted by controller 121 and may be stored in a receiver buffer 550. As will be understood, the management of the PHY layer includes operation of the receivers 510A-n, the interpretation of received signals, framing, octet synchronization, rate compensation, scrambling/descrambling, etc.

When the broadcast message is destined for the subscriber associated with the ONT 120, it will be retained in the receiver buffer 550 for further processing. Otherwise the contents of receiver buffer 550 may be discarded or overwritten by subsequent bit streams from the receivers 510. In various aspects, when the broadcast signal 310 is not destined for the subscriber associated with the ONT 120, the controller 121 may ignore the split signal 320 and not store the message in the receiver buffer 550. In various aspects, the controller 121 may determine whether the message is destined for the associated subscriber based on the timeslot in which the split signal 320 is received (i.e., whether it matches the timeslot for the associated subscriber) or a header in at least one of the carrier waves identifying the associated subscriber as the subscriber to whom the message is destined (e.g., via a destination MAC address).

The receiver buffer 550 (and the transmitter buffer 570) may be implemented as various devices that include computer-readable storage media. These devices may be standalone components or may be incorporated into the memory storage device 540 as dedicated sections of the memory storage device 540.

Because the broadcast signal 310 carries portions of a message destined for a subscriber on different carrier waves, the bit streams of each of the carrier waves received by each of the receivers 510A-n are stored in receiver buffer 550 to re-assemble the downstream message 305 at the ONT 120 for subsequent transmission to the subscriber. In various aspects, each of the signals include header and footer sections that the ONT 120 processes to determine the order in which to re-assemble the downstream message 305, wherein the headers and footers identify each portion's position in the message. In other aspects, only the lead signal (i.e., the signal comprising the first portion of the message) includes a header and only the tail signal (i.e., the signal comprising the last portion of the message) includes a footer, and the ONT 120 processes the signals based on an order associated with the carrier waves. For example, a carrier wave having wavelength $\lambda_1$ is always the lead signal, a carrier wave having wavelength $\lambda_2$ always comprises the second portion, a carrier wave having a wavelength $\lambda_3$ always comprises the third portion, etc.

As will be appreciated, a header may include a synchronization preamble, addressing information (destination, source, receiver, transmitter, service set identifier, etc.), length information, sequence information, signal type/protocol information, start delimiters, etc. As will also be appreciated, a footer may include a frame/portion check sequence, end of frame/portion information, an interpacket gap, etc. The type and format of information contained in a header or footer, and whether headers and footers are used, will be determined based on the protocols used for the PON, which one of skill in the art will be able to apply in conjunction with the present disclosure.

For example, the EPON standard developed by the Institute of Electrical and Electronic Engineers (IEEE), the GPON standard developed by the International Telecommunication Union (ITU), or a related standard for communication over a PON may be used to encapsulate the message for transmission. In EPON, messages may be encapsulated according to the Ethernet standards (e.g., IEEE 802.3), for example, as an Ethernet packet or Ethernet frame, while in GPON, the messages may be encapsulated according to Asynchronous Transfer Mode (ATM) or the GPON Encapsulation Mode (GEM). The method of encapsulation determines an order and a length of sections of the message so that the controller 121 knows how to interpret the signals it receives, which one of skill in the art will understand to include synchronization information, addressing information, checksums, and payloads organized within the bit stream of a signal according to the relevant standard. Additionally, depending on the standard used, a gap or spacing between one encapsulation and a subsequent encapsulation may be considered to be part of an encapsulation. The controller 121 may therefore be adapted to work with an existing network set up according to EPON or GPON to add WDM/TDM hybrid capabilities, and is capable of being switched between standards by updating software or changing the hardware controls to match the standard used by the existing PON.

Once the controller 121 has reassembled the message from the portions sent via the split signal 320, and the controller 121 has determined that the message is destined for its associated subscriber, the downstream message 305 will be transmitted from the receiver buffer 550 to the subscriber via the subscriber transceiver 560 or used internally (for example, management messages) by the ONT 120. The subscriber transceiver 560 also receives messages from the subscriber and stores them in a transmitter buffer 570.

The controller 121 is operable to reformat messages received by the receivers 510 into a different format for transmission by the subscriber transceiver 560 (and vice versa). For example, signals may be received from an OLT 110 according to GEM encapsulation and are translated into an Ethernet encapsulation for transmission to the subscriber. Additionally, if any bit scrambling is employed by the PON for the broadcast signal 310, the controller 121 will apply its unscrambling algorithm. An unscrambling algorithm may be established between the ONT 120 and the OLT 110 during initial setup (and may be periodically updated) to swap the order of bits in the transmission of the broadcast signal to prevent or discourage eavesdropping or third parties from deciphering which subscriber a message is destined for. For example, a bit scrambling algorithm may specify that the value of the third bit ($b_3$) and the value of the eighth bit ($b_8$) should be swapped so that the value of the byte/octet "10001011" carried by a signal should be interpreted by the controller 121 as "00001111." One of skill in the art will understand that a bit scrambling algorithm may specify more bits to be scrambled, for bits to be exchanged in a ring (e.g., $b_1$ for $b_2$, $b_2$ for $b_3$, $b_3$ for $b_1$), and for logical control masks to be applied in addition to or instead of value swaps (e.g., $b_1$=AND($b_2$, $b_3$)), and that the above example is a non-limiting illustration of bit scrambling. One of skill in the art will also understand that further encryption may be performed on the payload of the downstream message 305 that may be performed at the application layer by the subscriber.

In various aspects, depending on the subscriber's method of communication with the ONT 120 and the associated transmission medium, the subscriber transceiver 560 may include various hardware. For example, if the subscriber is communicated to the ONT 120 via fiber optic cables, the subscriber transceiver 560 may include an LD/photodiode pair and connecting terminals for the cabling, whereas if the subscriber is communicate to the ONT 120 via wireless transmissions, the subscriber transceiver 560 may include radio wave generation hardware and an antenna. Similarly, if the subscriber is communicated to the ONT 120 by coaxial cabling or by Ethernet cabling (e.g., cat-5, cat-5e, cat-6), the subscriber transceiver 560 will include the associated connecting terminals and transceiving hardware. As will be appreciated, several sets of hardware for communication over various transmission media may be included in the subscriber transceiver 560, or a single set of hardware may be included and adapted by an external converter to work with a different transmission medium.

The subscriber transceiver 560 is operable to receive messages from the subscriber and store them in the transmitter buffer 570 for transmission over the WDM/TDM hybrid PON by the transmitters 520. In various aspects, the transmitter buffer 570 may store several messages from the subscriber until the appropriate timeslot for transmission occurs. Messages are generally queued in the transmitter buffer 570 in a first-in-first-out order, although the subscriber or controller 121 may also prioritize or deprioritize certain messages within the queue relative to other messages by splitting transmitter buffer 570 into several priority queues to shape network traffic. In various aspects, in addition to the timeslots to transmit, the transmitter buffer 570 may be managed by a token bucket to shape network traffic generated by the subscriber and/or managed by rules specifying the maximum or minimum size of an upstream message 405 that may be transmitted in a timeslot.

When transmitting an upstream message 405 held in the transmitter buffer 570, the controller 121 will remove the upstream message 405 from the transmitter buffer 570 and divide it into portions to be encoded onto the carrier waves by the associated transmitters 520. Similar to how the subscriber transceiver 560 may transmit a message in a translated format, the controller 121 may translate the format of the signal received with the subscriber transceiver into a different format for transmission to the OLT 110.

The controller 121 also includes a power supply 580 to provide the power for the active components of the ONT 120. The active components may include the receivers 510, the transmitters 520, processor 530, memory storage device 540, receiver buffer 550, transmitter buffer 570, the subscriber transceiver 560, and any associated indicator lights or displays. In various aspects, the power supply 580 may receive power from the subscriber transceiver 560 (if using a wired transmission medium capable of carrying electrical current) injected into the transmission medium by the subscriber, or the power supply 580 may draw power from solar panels or an external power source. If the power supply 580 receives alternating current (AC) power, a transformer may be included to raise or lower the amplitude of the received voltage to a desired amplitude. Similarly, to supply active devices with direct current (DC) when AC power is received, the power supply 580 may include a rectifier to convert AC to DC. Optionally, the power supply 580 may include a battery that is charged when power is provided externally and consumed to power the controller 121 when no external power is provided.

Figure 6:
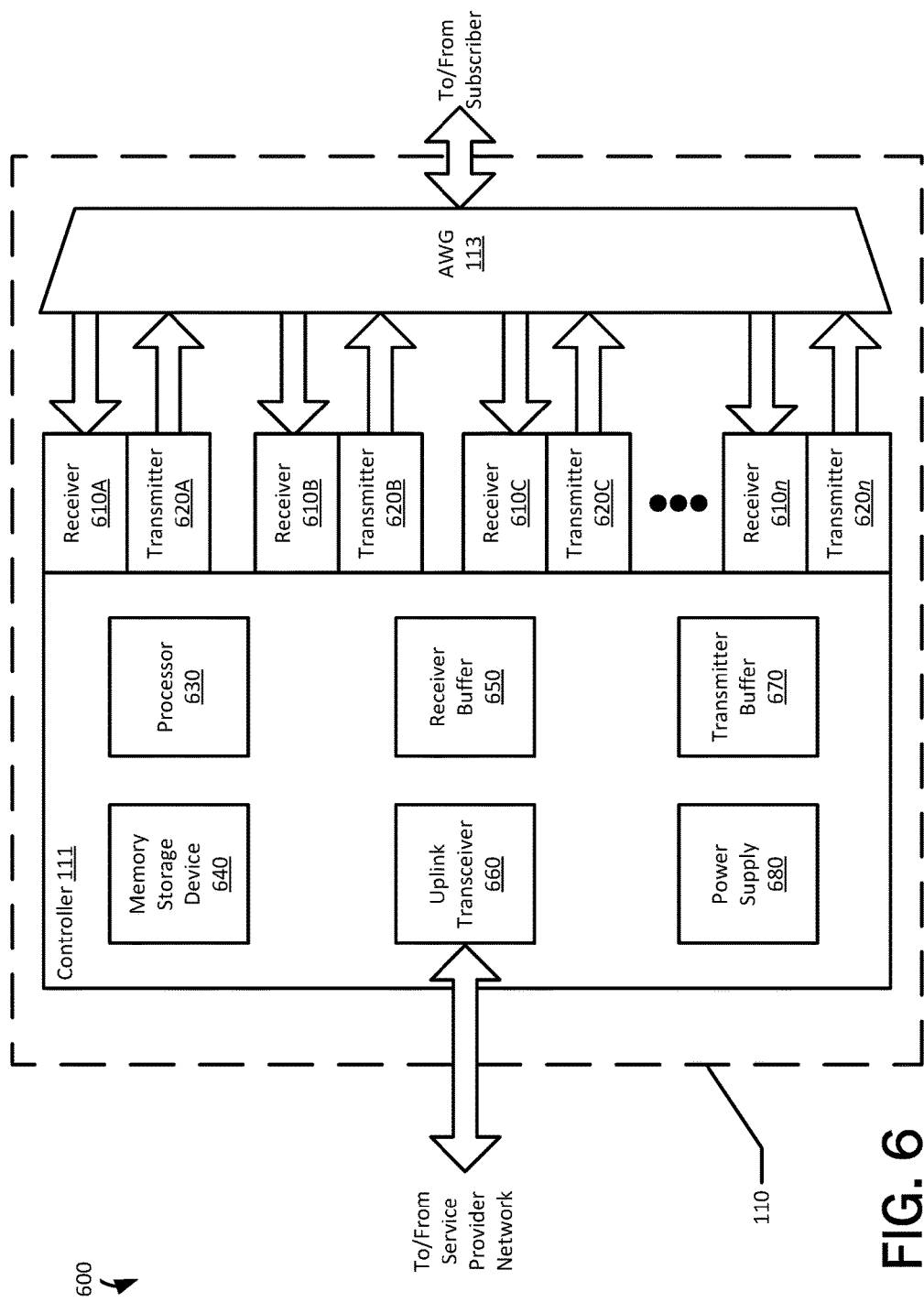
FIG. 6 is a block diagram illustrating an example detailed optical line terminal to send and receive signals for a service provider.

FIG. 6 is a block diagram illustrating an example detail 600 of an OLT 110 operable for use in a WDM/TDM hybrid PON to send and receive signals for a service provider. A service provider may use multiple OLTs 110 to communicate with distinct sets of subscribers having compatible ONTs 120, or one OLT 110 may include multiple sets of transceiving equipment communicated to distinct sets of subscribers controlled by a shared controller 111.

Similar to the ONT 120, the OLT 110 includes transceiving equipment to send and receive signals, which include receivers 610A-n (collectively, receivers 610) and transmitters 620A-n (collectively, transmitters 620). Each receiver 610 is matched by wavelength to a corresponding transmitter 520 at the subscribers' ONTs 120, and each transmitter 620 is matched by wavelength to a corresponding receiver 510 at the subscribers' ONTs 120. The matched pairs of receivers/transmitters each communicate over a single, fixed wavelength, therefore the hardware in both the ONT 120 and OLT 110 can make use of low-cost, non-tunable optical transceivers, as discussed above in relation to FIG. 5.

The number of the receivers 610 and transmitters 620 corresponds to a targeted speed increase multiplier and are used to transmit/receive messages carried in portions by multiple carrier waves. Any number of receivers 610 or transmitters 620 may comprise the respective array. The multiple carrier waves are multiplexed/demultiplexed onto a shared transmission medium by an AWG 113. In various aspects, the AWG 113 may be substituted for a thin film filter or other mux device. When multiple transmission media are used (e.g., separate fiber optic cables for incoming and outgoing signals) multiple AWG 113 are also employed to multiplex/demultiplex different signals of differing wavelengths onto one of the multiple transmission media.

The controller 111 includes a processor 630 and a memory storage device 640 including instructions, which, when executed by the processor 630, provide the functions of the OLT 110, including the sending, receiving, and processing of signals as part of a WDM/TDM hybrid PON. In terms of the OSI model, the controller 111 manages the functions of at least the PHY and data link layers of the network, including the LLC and MAC sublayers, and in some aspects, may also manage the functions of higher layers (e.g., network and transport layers).

The memory storage device 640 includes one or more computer-readable storage media. Computer-readable storage media are articles of manufacture operable to store data or computer-executable instructions. The term computer-readable storage media does not include transmission media over which signals are propagated. Example types of computer-readable storage media include, but are not limited to: solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices or articles of manufacture that store data.

Downstream messages 305 received from a service provider's network for transmission to subscribers are received by the OLT 110 by an uplink transceiver 660, and are stored in a transmitter buffer 670 for broadcast by the transmitters 620 to the subscribers. Similarly, combined signals 440 received from the subscribers by the receivers 610 are stored in a receiver buffer 650 for processing by the controller 111 and transmission by the uplink transceiver 660 to the service provider's network (e.g., service provider's edge routers, Ethernet switches) or use by the OLT 110 (e.g., management messages). The receiver buffer 650 and the transmitter buffer 670 may be implemented as various devices that include computer-readable storage media. These devices may be standalone components or may be incorporated into the memory storage device 640 as dedicated sections of the memory storage device 640. In various aspects, each subscriber may be associated with dedicated receiver buffers 650 and transmitter buffers 670 so that messages to or from an individual subscriber are not buffered with messages to or from other subscribers.

In various aspects, depending on the service provider's method of communication with the OLT 110 and the associated transmission medium, the uplink transceiver 660 may include various hardware. For example, if the service provider is communicated to the OLT 110 via fiber optic cables to an edge router, the uplink transceiver 660 may include an LD/photodiode pair and connecting terminals for the cabling, whereas if the service provider is communicated to the OLT 110 via Ethernet cables to a switch, the uplink transceiver 660 may include electrical receivers/transmitters and connecting terminals for the Ethernet cabling.

As will be appreciated, even when the OLT 110 communicates with both service providers and subscribers over fiber optic cables, different standards and encapsulation modes may be used between the OLT 110 and the service provider's network and the OLT 110 and the subscribers. For example, communications between the OLT 110 and the service provider's network may be formatted according to a DWDM standard, whereas communications between the OLT 110 and the subscribers are formatted according to a CWDM standard. As one of skill in the art will understand, signals transmitted according to CWDM have more leeway than signals transmitted according to DWDM in terms of frequency drift due to fewer carriers being used on a given transmission medium within a set range of frequencies, therefore less expensive transceiving equipment, which may be more prone to drift or given less time to cool between operation, may be used in conjunction with CWDM than in conjunction with DWDM. In another example, communications between the OLT 110 and the service provider's network may be encapsulated according to a native Ethernet encapsulation mode, whereas communications between the OLT 110 and the subscribers are formatted according to GEM.

Downstream messages 305 received by the uplink transceiver 660 are interpreted by the controller 111, stored in a transmitter buffer 670, and encoded on the carrier waves by the transmitters 620 for broadcast to the subscribers during the appropriate timeslot. As part of interpreting and encoding the downstream messages 305, the controller 111 is operable to translate the downstream message 305 from its received format into a format understood by the ONTs 120 if different formats are used. The OLT 110 is also operable to determine how to divide the downstream message 305 into multiple portions that are encoded onto the carrier waves for transmission as a broadcast signal 310.

The controller 111 is operable to set and manage the timeslots of the broadcast signals 310 transmitted to the subscribers in communication with the OLT 110. In various aspects, timeslots may be assigned to subscribers during an initial handshake as an ONT 120 is brought in communication with the OLT 110, and may be updated periodically as network conditions change (e.g., as one or more subscribers request more or less content). The assignment of each the timeslot within a given period of time may be done evenly among the subscribers or unevenly. For example, a first subscriber who subscribes to premium Internet service may be given more timeslots within a given period than a second subscriber who subscribes to basic internet service. In another example, a first subscriber who subscribes only to premium internet service may be given fewer timeslots within a given period than a second subscriber who subscribes to basic internet service, basic television service, and basic telephone service, although a greater number of timeslots for the transmission of messages related to internet services are given to the first customer than the second customer.

Because the broadcast signal 310 from the OLT 110 carries messages for each of the ONTs 120 in distinct timeslots, the ONTs 120 may use timeslots of the broadcast signals 310 to regulate and sync their transmissions to avoid interfering with one another over shared transmission media. Although the dedicated transmission media between each ONT 120 and optical splitter 140 in a PON may be of different lengths, each ONT 120 still receives the downstream messages 305 encoded on its split signal 320 in the same time order (i.e., a first downstream message 305 is always received before a second downstream message 305). The ONT 120 may therefore reassemble the message to extract the transmission instructions (e.g., Physical Layer Operations Administration and Maintenance (PLOAM)

messages for GPON, Multi-Point Control Protocol (MPCP) messages for EPON) from the OLT 110 to determine when to transmit a modulated signal 420 in the timeslots assigned by the OLT 110. For example, a first ONT 120 may transmit during the timeslot assigned to its subscriber by the OLT 110 (i.e., while receiving a split signal 320 containing a downstream message 305 destined for the subscriber associated with the first ONT 120) and a second ONT 130 may transmit during the timeslot assigned by the OLT 110 because each modulated signal 420, 430 from the ONTs 120, 130 will be received at the shared transmission media at a unique time. In another example, if each timeslot is of a fixed length of time, the ONTs 120, 130 may transmit during a timeslot after a downstream message 305 destined for the associated subscriber is received (e.g., one timeslot after, two timeslots after). The controller 111 may thus regulate the transmission times of the communicated ONTs 120 without requiring each ONT 120 to keep its own schedule or use different frequencies for transmission than the other ONTs 120.

Combines signals 440 received over the shared transmission medium are received by the receivers 610 and stored in a receiver buffer 650. As will be understood, the management of the receivers 610 includes the interpretation of signals received at the receivers 610A-n, framing, octet synchronization, rate compensation, scrambling/descrambling, etc. The controller 111 is operable to separate and reassemble the upstream messages 405, 410 from ONTs 120, 130 in communication with the OLT 110 carried by the carrier waves of the combined signal 440. Once the upstream messages 405, 410 have been separated and reassembled, the controller 111 is operable to encapsulate and format the upstream messages 405, 410 for transmission by the uplink transceiver 660 for transmission to the service provider's network.

The controller 111 also includes a power supply 680 to provide the power for the active components of the OLT 110. The active components may include the receivers 610, the transmitters 620, processor 630, memory storage device 640, receiver buffer 650, transmitter buffer 670, the uplink transceiver 660, and any associated indicator lights or displays. If the power supply 680 receives alternating current (AC) power, a transformer may be included to raise or lower the amplitude of the received voltage to a desired amplitude. Similarly, to supply active devices with direct current (DC) when AC power is received, the power supply 680 may include a rectifier to convert AC to DC. Optionally, the power supply 680 may include a battery that is charged when power is provided externally and consumed to power the controller 111 when no external power is provided.

Figure 7:
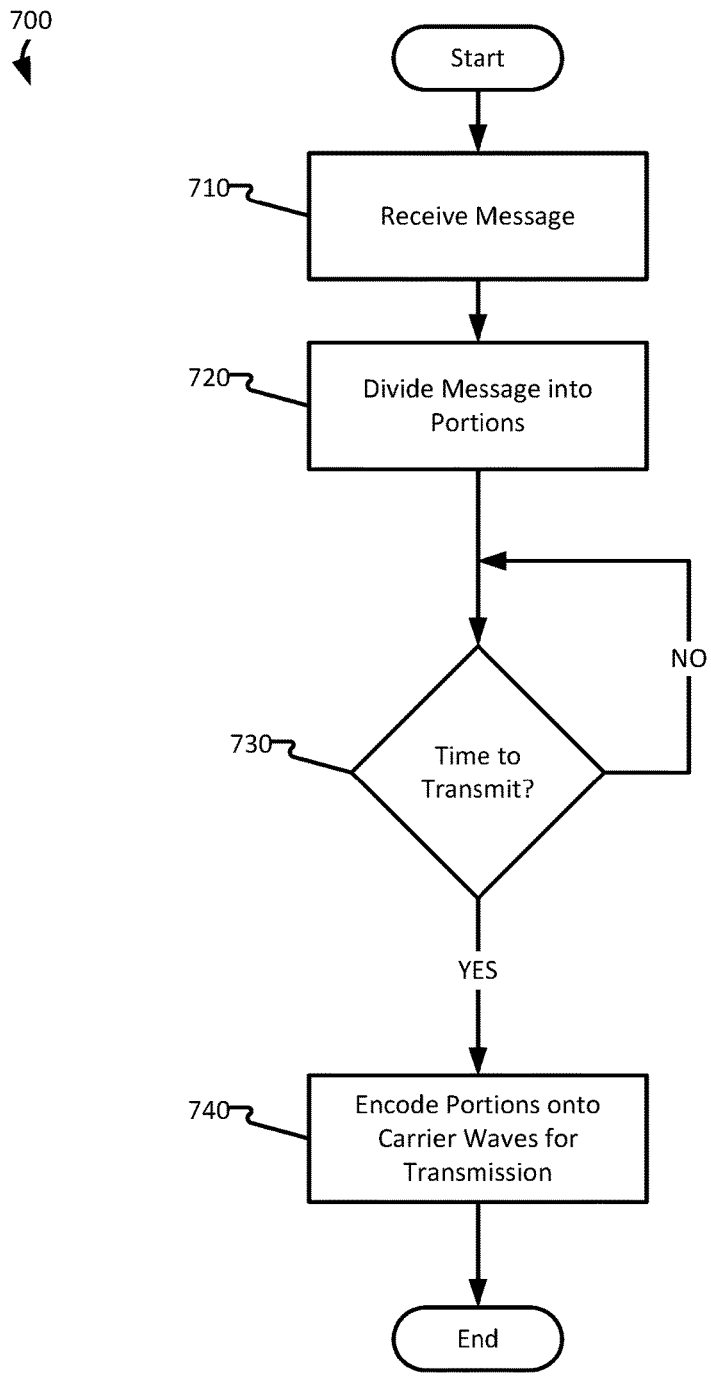
FIG. 7 is a flow chart illustrating general stages in an example method for transmitting messages over a passive optical network according to a hybrid of wavelength division multiplexing and time division multiplexing.

FIG. 7 is a flow chart illustrating general stages in an example method 700 for transmitting messages over a PON according to a hybrid of WDM and TDM. The method 700 begins when a message to transmit is received at OPERATION 710. The message may be received from a service provider at an OLT 110 or from a subscriber at an ONT 120.

Method 700 proceeds to OPERATION 720, where the message is divided into several portions. The number of portions that the message is divided into corresponds to the lesser of the service provider's target speed increase, the number of receivers at the destination, and the number of transmitters at the transmitting source. For example, a service provider may target a speed increase of 8× (e.g., to use a 10 Gbps network at 80 Gbps) and have an OLT 110 capable of transmitting with eight transmitters each at 10 Gbps, but the destination ONT 120 only has four receivers, and therefore the message would be divided into four portions. Similarly, if a service provider uses an OLT 110 capable of transmitting with eight transmitters each at 10 Gbps, and the destination ONT 120 has eights receivers, but the service provider only targeted a speed increase of 4× (e.g., to use a 10 Gbps network at 40 Gbps) the message would be divided into four portions. The above examples are non-limiting illustrations of determining how many portions to divide a message; one of skill in the art will understand from the foregoing that different numbers for the targeted speed increase, number of transmitters, and number of receivers may be practiced in accord with the present disclosure.

When dividing the message into portions, the transmitting source may, in various aspects, use different dividing techniques. In one aspect, the message may be divided and then each portion is treated as a payload that is encapsulated for transmission. In another aspect, the message may be encapsulated and then divided. Encapsulation may include a synchronization preamble, addressing information (destination, source, receiver, transmitter, service set identifier, etc.), length information, sequence information, signal type/protocol information, start delimiters, a frame/portion check sequence, end of frame/portion information, an interpacket gap information, etc., and will be organized according to the encapsulation protocol used by the PON (e.g., GEM, ATM, Ethernet). In aspects where the message is divided and then encapsulated, each portion is individually and fully encapsulated when transmitted to the receiving device. In aspects where the message is encapsulated and then divided, the message is fully encapsulated and the encapsulated message is divided into portions, and extra overhead, such as sequence number, may be added to each portion for reassembly by the receivers. In aspects where multiple messages are sent at the same time, for example a OLT 110 may transmit television service in a dedicated wavelength and internet service messages in parallel, each message may be encapsulated separately or each portion of each message may be encapsulated separately.

At DECISION OPERATION 730 it is determined whether it is time to transmit the portions of the message. In various aspects, a transmitting device may check whether it is time to transmit a message at regular intervals (e.g., every clock cycle, every ten clock cycles) or base its determination on received messages (e.g., a message received by an ONT 120 from the OLT 110 indicates that it is time for the ONT 120 to transmit to the OLT 110).

As will be understood from the present disclosure, the determination of whether it is time to transmit the portions of the message may result in the transmitting device waiting to transmit any message or waiting to transmit a given message, but transmitting a different message in the current timeslot. For example, when the transmitting device in an ONT 120, the ONT 120 may avoid transmitting any messages until a given timeslot occurs. In another example, when the transmitting device is an OLT 110, the OLT 110 may determine to transmit a first message to a first ONT 120 during a first timeslot and to transmit a second message to a second ONT 130 during a second timeslot, such that the OLT 110 does not avoid transmitting during a given timeslot, but selects which message is transmitted during that timeslot.

When it is determined that it is not time to transmit the portions of the message, DECISION OPERATION 730 will repeat its checks until it is determined that it is time to transmit the message (e.g., wait an additional n clock cycles, check whether the next message is destined for a given subscriber, etc.). When it is determined that it is time to transmit the message, method 700 proceeds to OPERATION 740.

At OPERATION 740 the portions are encoded onto carrier waves for transmission. Each transmitter of the transmitting device is associated with a carrier wave onto which a portion of the message may be encoded. As will be understood, when a target speed increase or a number of receivers at a receiving device is less than the number of transmitters at the transmitting device, some transmitters (and thereby some carrier waves) may go unused for encoding portions of the message thereon. In various aspects, the portions may be encoded onto the carrier waves for transmission via several means, including QAM, OOK, PPM, and PSK. Each of the carrier waves has a distinct frequency from the other carrier waves, which enables the division of a message across several wavelengths to be sent in a given timeslot. Because multiple receiving devices may receive the signal from the transmitting device, OPERATION 740 may optionally include bit scrambling to prevent an unauthorized device from reading the message, which may be in addition to any encryption of the message's payload. Method 700 concludes when the message has been encoded onto the carrier waves transmitted to the receiving device(s).

Figure 8:
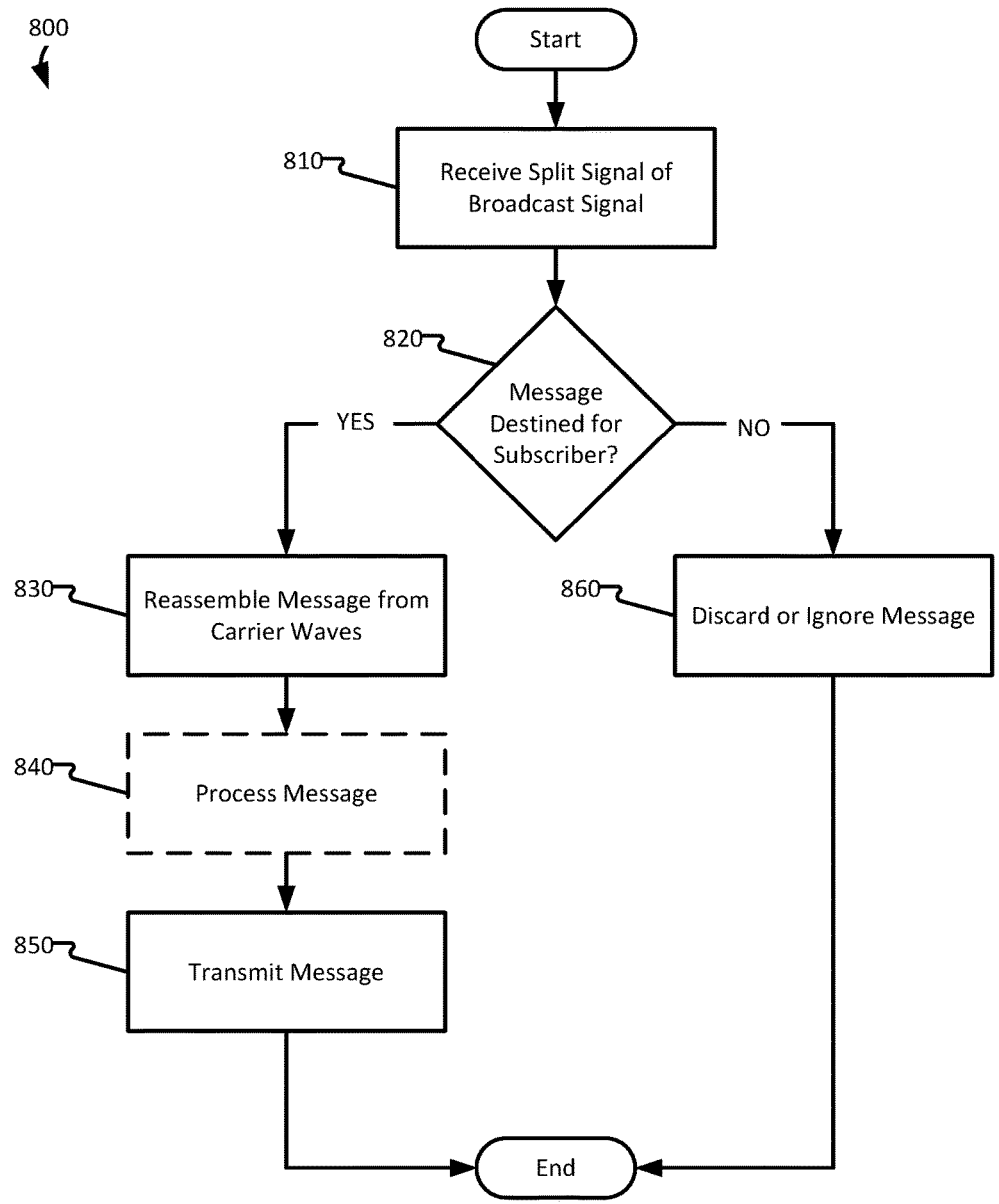
FIG. 8 is a flow chart illustrating general stages in an example method for receiving messages transmitted according to a hybrid of wavelength division multiplexing and time division multiplexing as a subscriber of a passive optical network.

FIG. 8 is a flow chart illustrating general stages in an example method 800 for receiving messages transmitted according to a hybrid of WDM and TDM for a subscriber of a PON. Method 800 begins at OPERATION 810 when the ONT 120 associated with a subscriber receives a split signal 320 of the broadcast signal 310 from a transmitting OLT 110. Because a broadcast signal 310 is transmitted via a broadcast to all ONTs 120 in communication with the OLT 110, method 800 proceeds to DECISION OPERATION 820 where it is determined whether the downstream message 305 is destined for the subscriber.

In various aspects, a downstream message 305 may be determined to be destined for a subscriber via different methods. In some aspects, a preamble in at least one of the portions of a message carried by a carrier wave may indicate that each of the carrier waves have a portion of downstream message 305 encoded thereon destined for a specific subscriber. For example, address information for a destination ONT 120 may be present on at least one of the carrier waves. In other aspects, the time during which a split signal 320 is received may be known to the ONT 120 as a timeslot for the ONT 120 or for a different ONT 130 such that any split signals 320 received outside of the timeslots known to be for the ONT 120 are determined to not be destined for the subscriber associated with the ONT 120.

When it is determined at DECISION OPERATION 820 that the split signal 320 includes a downstream message 305 destined for the subscriber associated with the receiving ONT 120, method 800 will proceed to OPERATION 830. When it is determined at DECISION OPERATION 820 that the split signal 320 does not include a downstream message 305 destined for the subscriber associated with the receiving ONT 120, method 800 will proceed to OPERATION 860.

At OPERATION 830, the message is reassembled from the carrier waves of the split signal 320. Because the broadcast signal 310 (and therefore the split signals 320) includes multiple carrier waves onto which portions of the downstream message 305 destined for the subscriber have been encoded, the ONT 120 will reassemble the downstream message 305 from the portions before processing the downstream message 305. In various aspects, the order of the portions may be known based on the frequency of the carrier wave. For example, a first carrier wave may carry a first portion of the downstream message 305, a second carrier wave may carry a second portion, etc., and the downstream message 305 may be reassembled by reading the portions carried by the associated carrier waves in order. In other aspects, the carrier waves may be scrambled, but include assembly information indicating which carrier wave carries which portion of the downstream message 305.

After the downstream message 305 has been reassembled from the carrier waves of the split signal 320, method 800 may proceed to OPTIONAL OPERATION 840. At OPTIONAL OPERATION 840, the message is processed by the ONT 120. In various aspects, processing the message may include descrambling any bit scrambling applied to the message by the OLT 110 and re-encapsulation of the message. For example, a message received in a GEM encapsulation may have its payload extracted and re-encapsulated into an Ethernet standard. Similarly, in aspects where each carrier wave carries a fully encapsulated portion of the message, each portion will have its encapsulation removed, and a single encapsulation will be applied to the reassembled message. As will be understood, when the subscriber receives messages according to the same encapsulation as the ONT 120 receives messages, no re-encapsulation is required.

Method 800 then proceeds to OPERATION 850, where the reassembled message is transmitted to the subscriber. In various aspects the message may be transmitted by a subscriber transceiver 560 transmitting the message via electrical signals over coaxial or Ethernet cables, via radio waves over the air, or via light waves via fiber optic cabling depending on the transmission media used to communicate with the subscriber and the ONT 120. Method 800 then concludes.

At OPERATION 860, when the downstream message 305 is not destined for the receiving ONT 120, the downstream message 305 is discarded or ignored by the ONT 120. A downstream message 305 corresponding to the split signal 320 destined for a subscriber not associated with the receiving ONT 120 may be received and discarded by the ONT 120. When discarding the downstream message 305, the message may be received into a receiver buffer 550, and a subsequent downstream message 305 may overwrite the receiver buffer 550 or the receiver buffer 550 may be cleared by the ONT 120. In some aspects, to conserve power, the ONT 120 may only activate or read from the receivers 510 during (or near) timeslots that it expects receive messages, and therefore any split signal 320 carried by the transmission media feeding the receivers 510 when they are inactive will be ignored by the ONT 120. In other aspects, the receivers 510 may remain active, but a message not destined for the subscriber associated with the ONT 120 will not be received into a receiver buffer 550. Method 800 then concludes.

Figure 9:
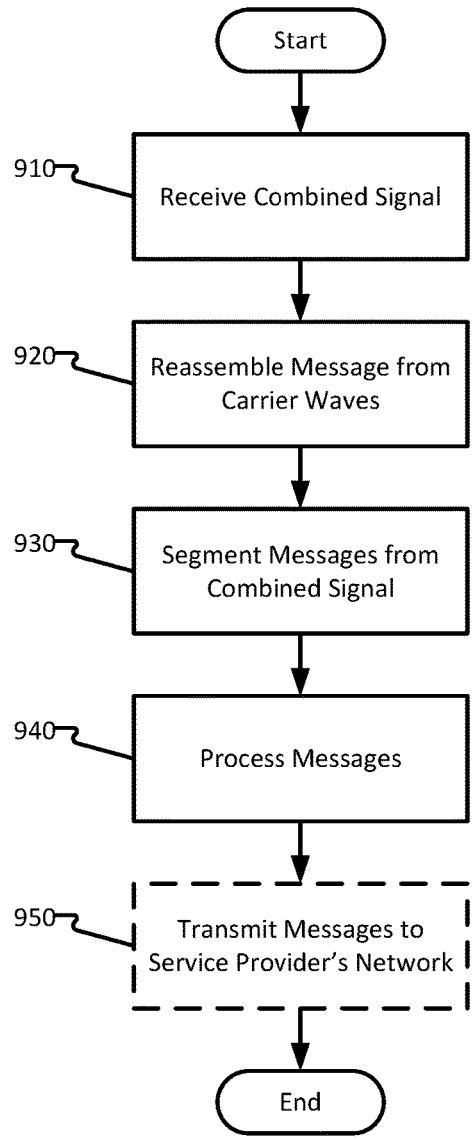
FIG. 9 is a flow chart illustrating general stages in an example method for receiving messages transmitted according to a hybrid of wavelength division multiplexing and time division multiplexing as the service provider of a passive optical network.

FIG. 9 is a flow chart illustrating general stages in an example method 900 for receiving messages transmitted according to a hybrid of WDM and TDM as the service provider of a PON. Method 900 begins at OPERATION 910 when the OLT 110 receives a combined signal 440 from an optical splitter 140 by which a plurality of ONTs 120 are communicated with the OLT 110.

The upstream message 405 is reassembled from the carrier waves of the combined signal 440 by the OLT 110 at OPERATION 920. A combined signal 440 includes multiple carrier waves which each carry portions of upstream messages 405 from subscribers to the service provider during a timeslot assigned for a given ONT 120. Each carrier wave has a dedicated wavelength onto which a portion of the upstream message 405 is encoded, which enables the OLT 110 to use an array of fixed-wavelength receivers 610 corresponding to the dedicated wavelengths that each ONT 120 transmits. In various aspects, the portions of the upstream message 405 may be encoded by QAM, OOK, PPM, or PSK onto the carrier waves, and each portion may be separately encapsulated or the upstream message 405 may be encapsulated as a whole before being divided into portions. The OLT 110 therefore is operable to interpret the bit streams of the several carrier waves of the combined signal 440 according to the methods of encoding and encapsulation used by the ONT 120 to transmit to reassemble the upstream message from the several carrier waves. In various aspects, the order of reassembly may be known to the OLT 110 based on dedicated carrier waves carrying known portions of the upstream message 405 (e.g., carrier wave $\Lambda_n$ is dedicated to carrying portion n of the upstream message 405) or the encapsulation of individual portions of the upstream message 405 may include ordering information for the associated portion within the upstream message 405.

Method 900 proceeds to OPERATION 930, where the received and reassembled upstream message 405 is segmented from the combined signal 440. Because a shared transmission medium is used to communicate several ONTs 120 with the OLT 110, and fixed-wavelength transmitters 520 and fixed-wavelength receivers 610 are used respectively, each carrier wave is operable to carry portions of a multiple upstream messages 405, 410 in different timeslots to reduce the likelihood of interference between upstream messages 405, 410 transmitted by different ONTs 120, 130. For example, a first ONT 120 may be assigned a first timeslot to transmit an upstream message 405 using the wavelengths $\Lambda_{1-n}$ and a second ONT 130 may be assigned a second timeslot to transmit a second upstream message 410 using the wavelengths $\Lambda_{1-n}$. The OLT 110 is therefore operable to segment the combined signal 440 by reading the combined signal 440 based on the timeslots or the encapsulation of one or more portions. For example, during the first timeslot, the bit streams received by the OLT 110 by its receivers 610 are interpreted to be from the first ONT 120 and during the second timeslot, the bit streams are interpreted to be from the second ONT 130. In another example, the encapsulation of an upstream message 405 (or the portions thereof) may indicate a "message start" or "message end" that the OLT 110 is operable to interpret as a segmentation point of the combined signal 440 so that a first upstream message 405 can be segmented from a second upstream message. In various aspects, the OLT 110 may store the segmented upstream messages 405, 410 in a single receiver buffer 650 or in multiple receiver buffers 650.

At OPERATION 940 the segmented upstream message 405 is processed. In various aspects, processing the upstream message 405 may include descrambling any bit scrambling applied to the message by the OLT 110 and re-encapsulation of the message. For example, a message received in a GEM encapsulation may have its payload extracted and re-encapsulated into an Ethernet standard. Similarly, in aspects where each carrier wave carries a fully encapsulated portion of the message, each portion will have its encapsulation removed. As will be understood, when the service provider receives messages according to the same encapsulation as the OLT 110 receives messages, no re-encapsulation is required, and processing the messages may involve determining whether the service provider's network or the OLT 110 is the final destination of the upstream message 405.

In various aspects, where the final destination of the upstream message 405 is the OLT 110, the OLT 110 may process the upstream message 405 and use its payload to affect the delivery of services from the OLT 110 to the transmitting ONT 120 with content already available to the OLT 110. For example, the OLT 110 may receive multiple television signals from the service provider's network regardless of whether any subscriber has requested such a channel, and a subscriber may request a different channel (broadcast or on-demand) to be transmitted via the upstream message 405. The OLT 110 may therefore process the payload of the upstream message 405 to encode the requested television signal onto the downstream message 305 destined for the subscriber during the subscriber's timeslot.

In aspects where the final destination is not the OLT 110, method 900 proceeds to OPTIONAL OPERATION 950, where the upstream message 405 is transmitted to the service provider's network. In various aspects the upstream message 405 may be transmitted by an uplink transceiver 660 transmitting the message via electrical signals over coaxial or Ethernet cables, via radio waves over the air, or via light waves via fiber optic cabling depending on the transmission media used to communicate with the service provider's network and the OLT 110. Method 900 then concludes.

Examples and aspects are described above with reference to block diagrams or operational illustrations of methods, systems, and devices. The functions/acts noted in the blocks may occur out of the order as shown in any flowchart or described herein with reference to FIGS. 7-9. For example, two processes shown or described in succession may in fact be executed substantially concurrently or the blocks may sometimes be executed in the reverse order, depending upon the functionality/acts involved. Similarly, the component articles of manufacture illustrated in the diagrams of systems and devices described herein may be rearranged, reordered, multiplied, or (depending on the functionalities involved) be implemented by more or fewer components than illustrated. For example, the functionality of transceivers may be implemented as discrete receivers and transmitters.

While certain examples and aspects have been described, other examples and aspects may exist. The foregoing description of the exemplary aspects has been presented for the purposes of illustration and description. It is not intended to be exhaustive or to limit the present disclosure to the precise form disclosed. Many modifications and variations are possible in light of the above teaching. It is intended that the scope of the present disclosure be limited not with this detailed description, but rather by the claims appended hereto.

I claim:

1. A hybrid wavelength division multiplexing and time division multiplexing system comprising:
   a passive optical network (PON);
   a plurality of network devices absent tunable optical transceivers comprising Optical Line Terminals (OLTs), each OLT including an arrayed wave guide (AWG) coupled to the PON, wherein each OLT:
   receives a message to transmit over the PON;
   divides the message into a plurality of portions;
   determines when it is time to transmit the plurality of portions over the PON;
   encodes each portion of the plurality of portions of the message onto a carrier wave, wherein each carrier wave of each portion of the message has a wavelength distinct from the wavelengths of the other carrier waves; and transmits the carrier waves with the plurality of portions of the message having distinct wavelengths from an output of the AWG over the PON to an optical splitter coupled to a receiving terminal that includes at least one non-tunable optical transceiver.

2. The system of claim 1, wherein the receiving terminal comprises an Optical Network Terminal (ONT).

3. The system of claim 2, wherein the OLT includes at least one non-tunable optical transceiver coupled to an input of the AWG.

4. The system of claim 1, further to reassemble the message from the portions encoded on the carrier waves.

5. The system of claim 1, further to transmit the message during a timeslot designated for a subscriber to receive messages according to time division multiplexing parameters.

6. The system of claim 1, wherein each OLT further comprises at least one non-tunable transceiver that includes a laser diode.

7. The system of claim 1, wherein each OLT further comprises at least four non-tunable optical transceivers, each non-tunable optical transceiver to generate a carrier wave having a distinct wavelength.

8. The system of claim 1, wherein an input of the AWG couples to a plurality of non-tunable optical transceivers, each non-tunable optical transceiver to receive a carrier wave having a distinct wavelength.

9. The system of claim 1, further comprising a 10G PHY coupled to a media access control (MAC) layer to provide security, packet shaping, and encapsulation.

10. The system of claim 1, further comprising a controller and a plurality of receiving terminals comprising a plurality of ONTs, wherein the controller schedules a respective timeslot for each ONT.

11. The system of claim 10, further to periodically reassign timeslots as network conditions change to vary a bandwidth for a subscriber connection while maintaining a constant burst speed.

12. The system of claim 1, further to encode portions of the message onto respective carrier waves via amplitude shift keying schema including Quadrature Amplitude Modulation (QAM) and On-Off Keying (OOK), pulse-position modulation (PPM), and phase shift keying (PSK).

13. The system of claim 1, wherein each OLT includes a plurality of non-tunable optical transceivers that transmit simultaneously during a specified timeslot.

14. A hybrid wavelength division multiplexing and time division multiplexing system for a PON comprising:
a plurality of network devices absent tunable optical transceivers comprising OLTs OLT coupled to the PON, each OLT comprising:
a power source;
an AWG having a plurality of inputs and an output;
a plurality of non-tunable optical transceivers coupled to the plurality of inputs of the AWG, each non-tunable optical transceiver having a fixed wavelength; and
a controller to control the transmission of messages from the plurality of non-tunable optical transceivers via the output of the AWG to an optical splitter including transmission of one or more carrier waves encoded with one or more message portions having distinct wavelengths from the optical splitter to at least one ONT that includes at least one non-tunable optical transceiver.

15. The system of claim 14, wherein the controller includes a processor and a memory storage device including instructions which, when executed by the processor, control sending, receiving, and processing of conveyed signals.

16. The system of claim 14, wherein the controller manages functions of at least a PHY layer and a data link layer including Logical Link Control (LLC) and one or more MAC sublayers.

17. The system of claim 14, wherein the controller includes an algorithm to swap an order of bits in a transmission of a broadcast signal to prevent or discourage eavesdropping or third parties from deciphering the broadcast signal.

18. A non-transitory computer readable medium that includes executable instructions which, when executed by a processor, enable a hybrid of wavelength division multiplexing and time division multiplexing by using a plurality of network devices absent tunable optical transceivers comprising OLTs, each OLT including an AWG coupled to a PON for:
receiving a message to transmit over the PON;
dividing the message into a plurality of portions;
determining when it is time to transmit the plurality of portions over the PON;
encoding each portion of the plurality of portions of the message onto a carrier wave, wherein each carrier wave of each portion of the message has a wavelength distinct from the wavelengths of the other carrier waves; and
transmitting the carrier waves with the plurality of portions of the message having distinct wavelengths from an output of the AWG over the PON to an optical splitter coupled to a receiving terminal that includes a plurality of non-tunable optical transceivers.

19. The non-transitory computer readable medium of claim 18, wherein the transmitting comprises transmitting the message during a timeslot designated for a subscriber to receive messages according to time division multiplexing parameters.

20. The non-transitory computer readable medium of claim 18, further to periodically reassign timeslots as network conditions change to vary a bandwidth for a subscriber connection while maintaining a constant burst speed.

* * * * *